(12) United States Patent
Lawrence et al.

(10) Patent No.: US 12,359,593 B2
(45) Date of Patent: Jul. 15, 2025

(54) MODULAR ASSEMBLIES FOR CRANKCASE OIL SEPARATORS

(71) Applicant: Caterpillar Inc., Peoria, IL (US)

(72) Inventors: Rodney Allen Lawrence, Frankfort, IN (US); Brandyn A. Stack, Lafayette, IN (US); Eric W. Ferguson, Cottage Grove, MN (US); Yegor Litvinov, Shakopee, MN (US)

(73) Assignee: Caterpillar Inc., Peoria, IL (US)

( * ) Notice: Subject to any disclaimer, the term of this patent is extended or adjusted under 35 U.S.C. 154(b) by 183 days.

(21) Appl. No.: 18/092,525

(22) Filed: Jan. 3, 2023

(65) Prior Publication Data
US 2024/0218817 A1    Jul. 4, 2024

(51) Int. Cl.
*B01D 46/62*    (2022.01)
*B01D 46/58*    (2022.01)
(Continued)

(52) U.S. Cl.
CPC ............ *F01M 13/04* (2013.01); *B01D 46/58* (2022.01); *B01D 46/62* (2022.01);
(Continued)

(58) Field of Classification Search
CPC ........... F01M 13/04; F01M 2013/0438; F01M 2013/0472; F01M 2013/005;
(Continued)

(56) References Cited

U.S. PATENT DOCUMENTS

| 2,642,052 A | 6/1953 | Wagner et al. |
| 4,768,493 A | 9/1988 | Ohtaka et al. |

(Continued)

FOREIGN PATENT DOCUMENTS

| CN | 1070428 | 9/2001 |
| CN | 203436916 | 2/2014 |

(Continued)

OTHER PUBLICATIONS

U.S. Appl. No. 18/092,502, filed Jan. 3, 2023, Crankcase Oil Separator for Internal Combustion Engine.
(Continued)

*Primary Examiner* — George C Jin
*Assistant Examiner* — Teuta B Holbrook
(74) *Attorney, Agent, or Firm* — Schwegman Lundberg & Woessner, P.A.

(57) ABSTRACT

Apparatuses, systems and methods are disclosed for separating oil from a blow-by gas of an engine. An example includes a method that includes passing the blow-by gas to a first oil separating apparatus and a second oil separating apparatus, wherein the first oil separating apparatus and the second oil separating apparatus are physically coupled together along interfacing surfaces and in fluid communication with one another as an array, separating the blow-by gas by passing the blow-by gas through respective filters of the first oil separating apparatus and the second oil separating apparatus, removing the oil from the blow-by gas with the respective filters and recombining the blow-by gas after passing from the respective filters; passing the blow-by gas as a single flow stream from the first oil separating apparatus and the second oil separating apparatus.

17 Claims, 24 Drawing Sheets

(51) Int. Cl.
*F01M 13/04* (2006.01)
*F01M 13/00* (2006.01)

(52) U.S. Cl.
CPC .............. *F01M 2013/0066* (2013.01); *F01M 2013/0072* (2013.01); *F01M 2013/0438* (2013.01)

(58) Field of Classification Search
CPC ........ F01M 2013/0072; B01D 46/2411; B01D 46/62; B01D 46/58; B01D 46/60; B01D 46/64
USPC ............... 123/41.86, 572, 573; 96/190, 191; 184/6.24; 55/DIG. 19; 95/273
See application file for complete search history.

(56) References Cited

U.S. PATENT DOCUMENTS

| | | | |
|---|---|---|---|
| 5,171,338 A * | 12/1992 | Baert | B01D 46/04 55/528 |
| 5,277,154 A | 1/1994 | Mcdowell | |
| 5,450,835 A | 9/1995 | Wagner | |
| 5,456,239 A | 10/1995 | Henderson et al. | |
| 5,937,837 A | 8/1999 | Shaffer et al. | |
| 6,234,154 B1 | 5/2001 | Spix | |
| 6,561,171 B2 | 5/2003 | Burgess | |
| 6,691,687 B1 | 2/2004 | Liang et al. | |
| 6,702,941 B1 | 3/2004 | Haq et al. | |
| 7,011,690 B2 | 3/2006 | Altvater et al. | |
| 7,182,864 B2 | 2/2007 | Brown et al. | |
| 7,311,208 B2 | 12/2007 | Brown et al. | |
| 7,635,409 B2 | 12/2009 | Mahoney et al. | |
| 8,210,135 B2 | 7/2012 | Slaughter et al. | |
| 8,657,901 B2 | 2/2014 | Chapman | |
| 9,169,808 B2 | 10/2015 | Kitagawa | |
| 9,222,698 B2 | 12/2015 | Mcclanahan et al. | |
| 9,447,714 B2 | 9/2016 | Khan et al. | |
| 9,581,061 B2 | 2/2017 | Kurita et al. | |
| 9,650,927 B2 | 5/2017 | Subedi et al. | |
| 9,677,507 B2 | 6/2017 | Kurosawa et al. | |
| 9,702,282 B2 | 7/2017 | Peck et al. | |
| 9,926,888 B2 | 3/2018 | Okawa et al. | |
| 10,001,040 B2 | 6/2018 | Copley et al. | |
| 10,184,444 B2 | 1/2019 | Plenk | |
| 10,213,715 B2 | 2/2019 | South et al. | |
| 10,543,442 B2 | 1/2020 | Janakiraman et al. | |
| 10,550,742 B2 | 2/2020 | Zuerker et al. | |
| 10,704,434 B2 | 7/2020 | Akita et al. | |
| 10,876,445 B2 | 12/2020 | Kress et al. | |
| 10,876,631 B2 | 12/2020 | Zuerker et al. | |
| 11,311,829 B2 | 4/2022 | Nelson et al. | |
| 11,331,606 B2 | 5/2022 | Roy et al. | |
| 11,839,842 B2 | 12/2023 | Piva et al. | |
| 11,946,397 B1 | 4/2024 | Lawrence et al. | |
| 12,023,619 B2 | 7/2024 | Parikh et al. | |
| 2003/0102257 A1 * | 6/2003 | Reid | B01D 46/88 210/232 |
| 2004/0089600 A1 * | 5/2004 | Haq | B01D 46/522 210/337 |
| 2006/0090651 A1 * | 5/2006 | Liu | B01D 71/02231 210/500.25 |
| 2008/0035103 A1 | 2/2008 | Barris et al. | |
| 2009/0199794 A1 | 8/2009 | Slaughter et al. | |
| 2010/0051388 A1 | 3/2010 | Clark et al. | |
| 2014/0182569 A1 | 7/2014 | Hwang et al. | |
| 2017/0014745 A1 * | 1/2017 | Zuerker | B01D 50/20 |
| 2019/0218947 A1 | 7/2019 | Akita et al. | |
| 2022/0314148 A1 | 10/2022 | Calcaterra et al. | |
| 2023/0313750 A1 | 10/2023 | Li et al. | |

FOREIGN PATENT DOCUMENTS

| | | | |
|---|---|---|---|
| CN | 107701263 A * | 2/2018 | ............. F01M 13/04 |
| CN | 207420558 | 5/2018 | |
| CN | 108993050 A * | 12/2018 | ......... B01D 46/2411 |
| CN | 109424388 | 10/2020 | |
| CN | 111927594 A * | 11/2020 | ............. F01M 13/00 |
| CN | 112824656 | 5/2021 | |
| CN | 112901309 | 6/2021 | |
| DE | 102004031619 | 2/2006 | |
| DE | 10310452 | 8/2008 | |
| DE | 112011101646 T5 | 7/2013 | |
| DE | 102016006095 A1 | 1/2017 | |
| EP | 774289 A1 * | 5/1997 | ......... B01D 46/0067 |
| EP | 2478949 | 7/2012 | |
| EP | 1965045 | 12/2012 | |
| EP | 2934716 | 10/2015 | |
| JP | 2007247448 | 9/2007 | |
| JP | 4448418 | 1/2010 | |
| JP | 5085523 | 9/2012 | |
| JP | 6126885 | 4/2017 | |
| JP | 2017066963 | 4/2017 | |
| KR | 20210009662 | 1/2021 | |
| KR | 20220104883 A * | 7/2022 | |
| WO | 2020064205 | 4/2020 | |
| WO | 2022187897 A1 | 9/2022 | |

OTHER PUBLICATIONS

U.S. Appl. No. 18/092,547 U.S. Pat. No. 11,867,099, filed Jan. 3, 2023, Crankcase Ventilation System Architecture.
U.S. Appl. No. 18/141,579 U.S. Pat. No. 11,946,397, filed May 1, 2023, Pre-Heated Crankcase Ventilation System Architecture.
U.S. Appl. No. 18/519,582, filed Nov. 27, 2023, Crankcase Oil Separation Device for Internal Combustion Engine.
U.S. Appl. No. 18/904,617, filed Oct. 2, 2024, Oil Separation Device and Array for Internal Combustion Engine.
U.S. Appl. No. 18/928,304, filed Oct. 28, 2024, Multi-Stage Blow-By Gas Filtering for Internal Combustion Engine.
U.S. Appl. No. 18/941,921, filed Nov. 8, 2024, Coalescing Filter With Interface and Orientation Features.
German Patent and Trademark Office action and Search Report for Patent Application No. 10 2023 136 812.5, mailed Feb. 25, 2025 (05 pgs).

* cited by examiner

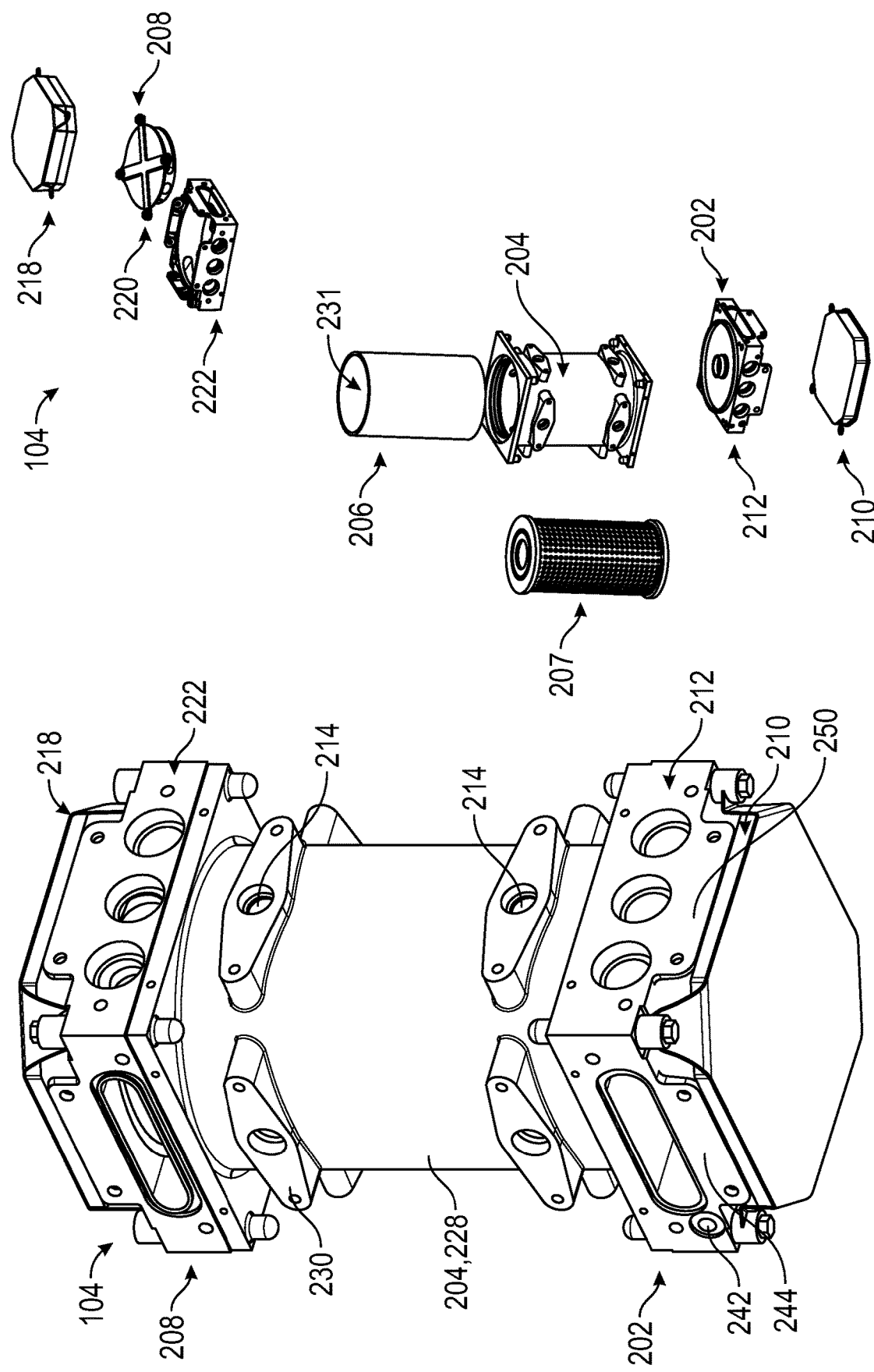

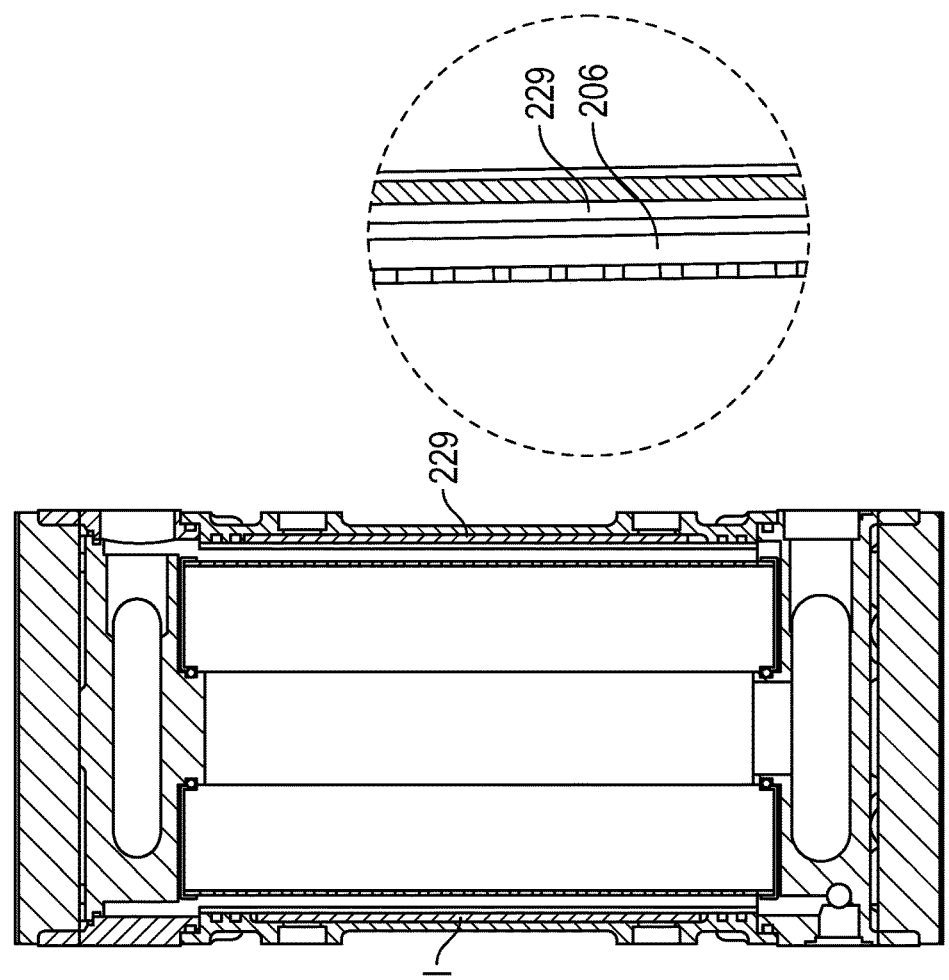
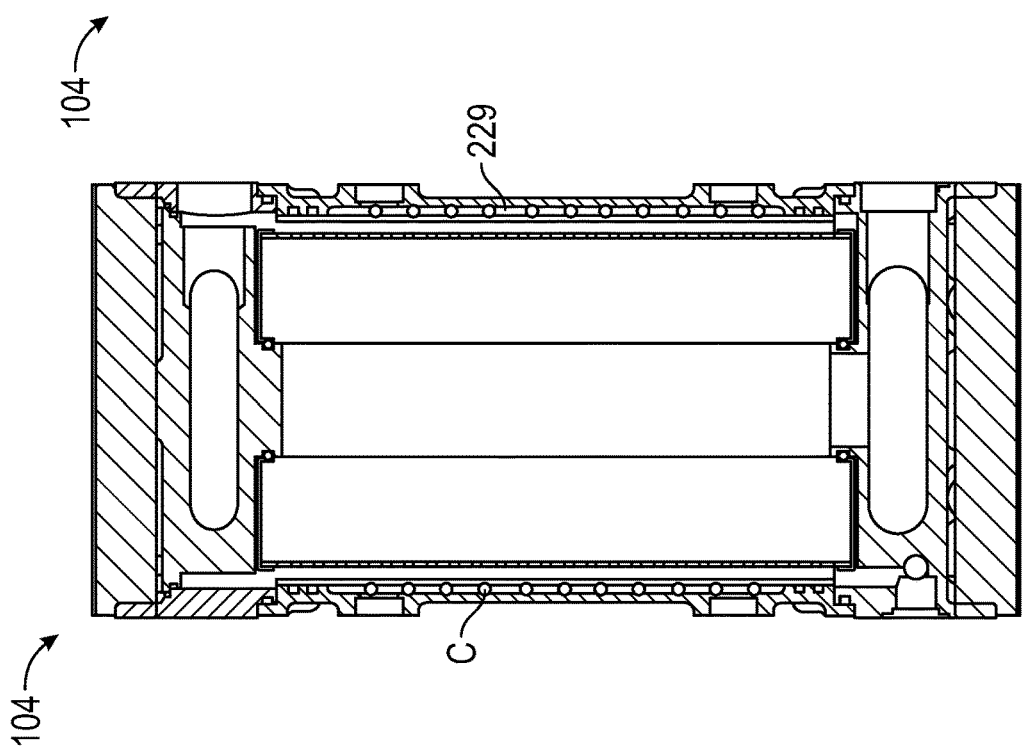
FIG. 2F
FIG. 2E
FIG. 2D

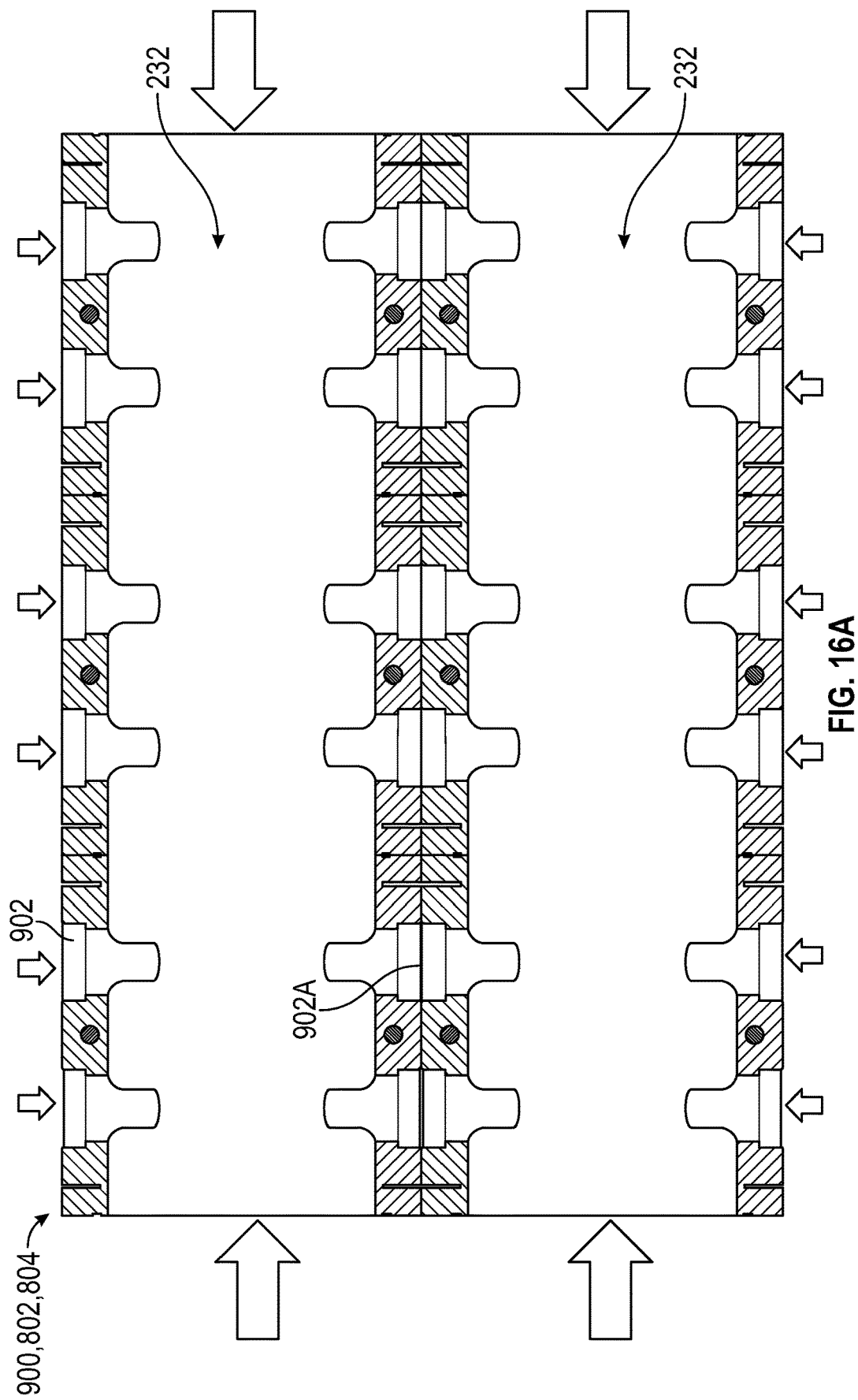

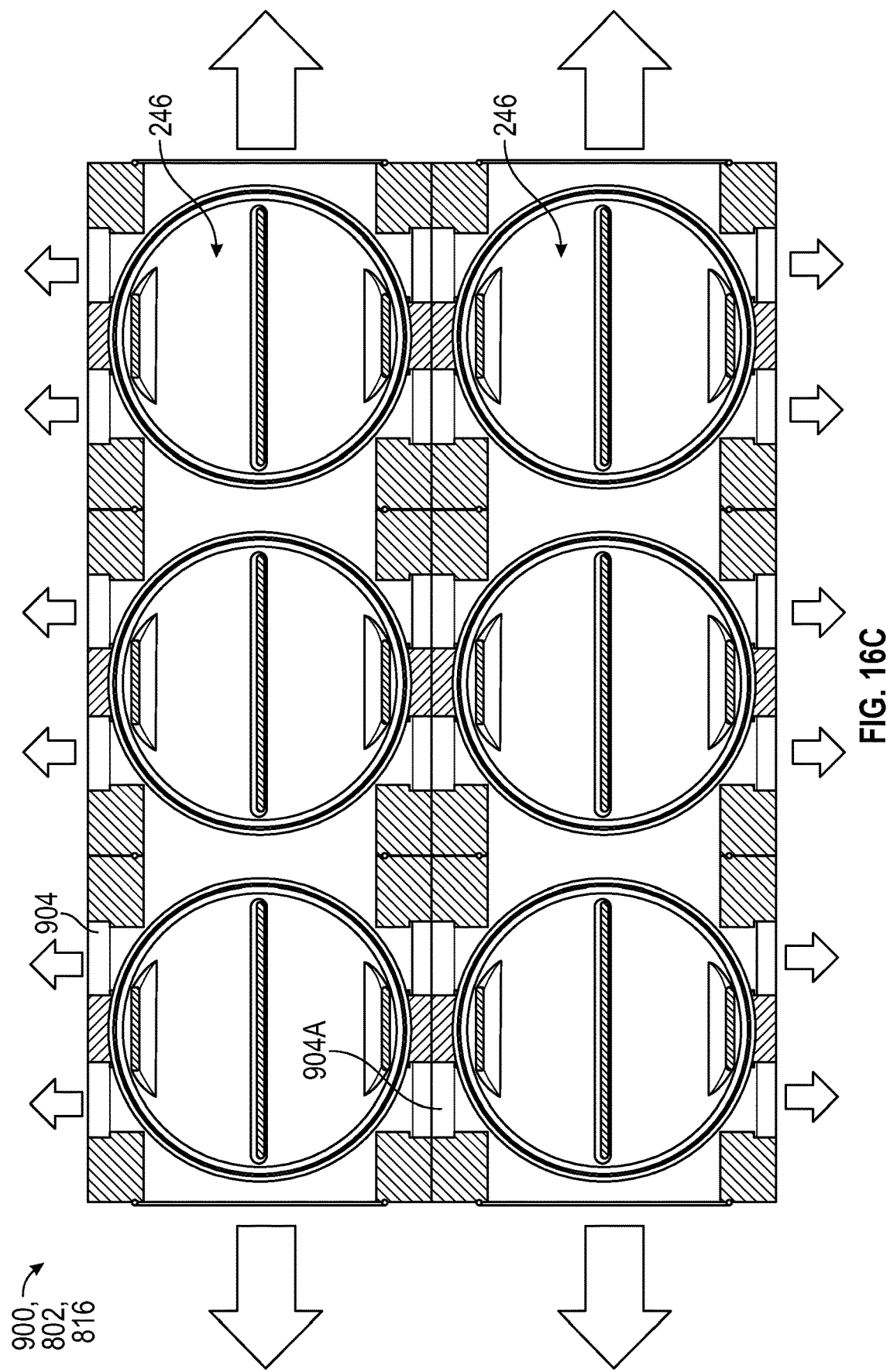

MODULAR ASSEMBLIES FOR CRANKCASE OIL SEPARATORS

TECHNICAL FIELD

The present disclosure relates to internal combustion engines such as those for vehicles or stationary power generation. More particularly, the present disclosure relates to internal combustion engines having oil separation devices.

BACKGROUND

Machinery, for example, agricultural, industrial, construction or other heavy machinery can be propelled by an internal combustion engine(s). Internal combustion engines can be used for other purposes such as for power generation. Internal combustion engines combust a mixture of air and fuel in cylinders and thereby produce drive torque and power. A portion of the combustion gases (termed "blow-by") may escape the combustion chamber past the piston and enter undesirable areas of the engine such as the crankcase. Blow-by can contain un-combusted fuel, oil and explosive gases. In rare cases, un-combusted fuel and/or explosive gases can build within the engine such as within the crankcase. The un-combusted fuel and/or explosive gases can result in an explosion if not properly mitigated such as by a relief valve. Crankcase ventilation systems are known in combustion engines to vent, capture or dilute blow-by gases of the crankcase. Such ventilation systems can include oil separation devices as part of such systems. For example, U.S. Pat. Nos. 9,702,282B2 and 10,550,742B2 disclose examples of an oil separation device that is part of crankcase ventilation system. However, both U.S. Pat. No. 10,550,742B2 and U.S. Pat. No. 9,702,282B2 do not utilize a jacket to insulate, cool or heat a coalescing filter in a desired manner. The '742 Patent discloses an arrangement of devices that employ parallel inlet and outlet channels for blowby gas.

SUMMARY

In an example according to this disclosure, an assembly for separating oil from a blow-by gas of an engine including: a first oil separating apparatus including: an outer housing; a first filter configured to separate the oil from the blow-by gas positioned within the outer housing; a first cover connected to at least the outer housing at a first end portion thereof, wherein the first cover is in fluid communication with the first filter via a first manifold defined by the first cover, and wherein the first cover has a first plurality of ports that communicate with the first manifold; and a second cover connected to at least the outer housing at a second end portion thereof, wherein the second cover is in fluid communication with the first filter via a second manifold defined by the second cover, and wherein the second cover has a second plurality of ports that communicate with the second manifold; a second oil separating apparatus including: a second outer housing; a second filter configured to separate the oil from the blow-by gas positioned within the outer housing; a third cover connected to at least the second outer housing at a first end portion thereof, wherein the third cover is in fluid communication with the second filter via a third manifold defined by the third cover, and wherein the third cover has a third plurality of ports that communicate with the third manifold, wherein at least one of the third plurality of ports of the third cover are in fluid communication with at least one of the first plurality of ports of the first cover such that the third manifold is in fluid communication with the first manifold; and a fourth cover connected to at least the second outer housing at a second end portion thereof, wherein the fourth cover is in fluid communication with the second filter via a fourth manifold defined by the fourth cover, and wherein the fourth cover has a fourth plurality of ports that communicate with the fourth manifold, wherein at least one of the fourth plurality of ports of the fourth cover are in fluid communication with at least one of the second plurality of ports of the second cover such that the fourth manifold is in fluid communication with the second manifold.

In yet another example according to this disclosure, a method of separating oil from a blow-by gas of an engine, the method including: passing the blow-by gas to a first oil separating apparatus and a second oil separating apparatus, wherein the first oil separating apparatus and the second oil separating apparatus are physically coupled together along interfacing surfaces and in fluid communication with one another as an array; separating the blow-by gas by passing the blow-by gas through respective filters of the first oil separating apparatus and the second oil separating apparatus; removing the oil from the blow-by gas with the respective filters; recombining the blow-by gas after passing from the respective filters; and passing the blow-by gas as a single flow stream from the first oil separating apparatus and the second oil separating apparatus.

In yet another example according to this disclosure an engine system including: an engine; an array of oil separating apparatuses, wherein the array of the oil separating apparatuses includes an assembly of at least a first oil separating apparatus and a second oil separating apparatus that are physically coupled together along interfacing surfaces and in fluid communication with one another; a first one or more fluid lines passing a blow-by gas from the engine to the array of the oil separating apparatuses, wherein oil is separated from the blow-by gas by passing through respective filters of the least the first oil separating apparatus and the second oil separating apparatus; and a second one or more fluid lines passing the blow-by gas from the array of the oil separating apparatuses back to the engine.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2 is a perspective view of the oil separation device according to one example of the present application.

FIG. 2A is an exploded view of components of the oil separation device of FIG. 2.

FIG. 2D is the cross-sectional view of FIG. 2C with heating elements placed in a jacket around an coalescing filter.

FIG. 2E is the cross-sectional view of FIG. 2C with insulation placed in the jacket.

FIG. 2F is an enlarged view of the cross-sectional view of FIG. 2D.

FIG. 8A shows the assembly of the plurality of oil separation devices arranged in the single row array with a second configuration according to one example of the present application.

FIG. 8B shows the assembly of the plurality of oil separation devices arranged in the single row array with a third configuration according to one example of the present application.

FIG. 16A is a first cross-sectional view of the first covers of the third assembly of the plurality of oil separation devices of FIG. 16 showing potential entry locations for blow-by gas into the first covers via ports and passages.

FIG. 16C is a third cross-sectional view of the second covers of the third assembly of the plurality of oil separation devices of FIG. 16 showing potential exit locations for blow-by gas into the second covers via ports and passages.

DETAILED DESCRIPTION

Examples according to this disclosure are directed to an oil separation device(s) for internal combustion engines, and to systems and methods for filtering oil to separate oil and other forms of particulate matter from blow-by gas. Examples of the present disclosure are now described with reference to the accompanying drawings. The following description is merely exemplary in nature and is not intended to limit the present disclosure, application, or use. Examples described set forth specific components, devices, and methods, to provide an understanding of embodiments of the present disclosure. It will be apparent to those skilled in the art that specific details need not be employed and that examples may be embodied in many different forms. Thus, the examples provided should not be construed to limit the scope of the claims.

Figure 1:
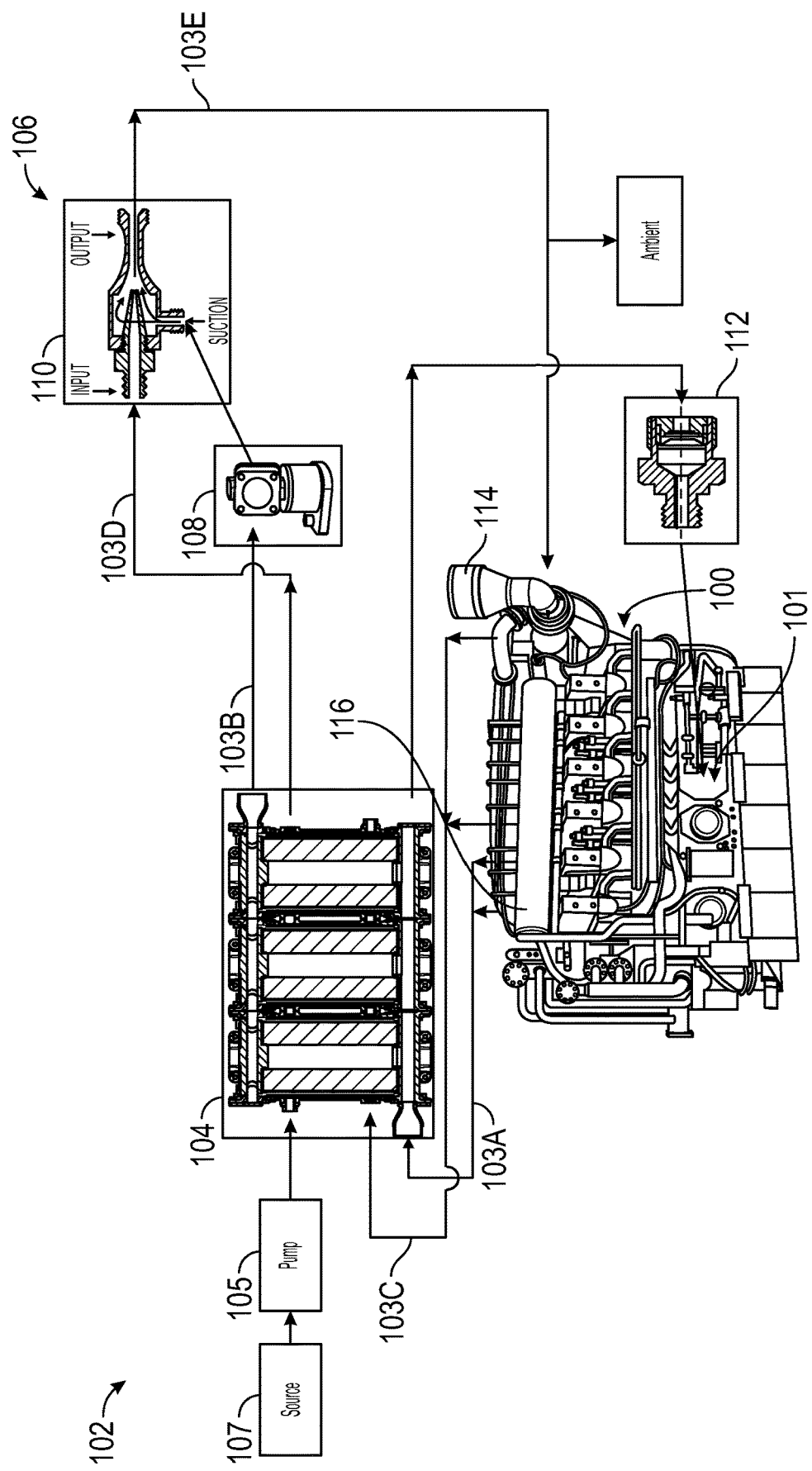
FIG. 1 is a schematic illustration depicting an example internal combustion engine with a system including a blow-by gas oil separation device in accordance with an example of the present application.

FIG. 1 depicts an example schematic illustration of an engine 100 in accordance with this disclosure. The engine 100 can be used for power generation such as for the propulsion of vehicles or other machinery. The engine 100 can include various power generation platforms, including, for example, an internal combustion engine, whether gasoline, natural gas, dynamic gas blending, or diesel. It is understood that the present disclosure can apply to any number of piston-cylinder arrangements and a variety of engine configurations including, but not limited to, V-engines, inline engines, and horizontally opposed engines, as well as overhead cam and cam-in-block configurations.

In some applications, the internal combustion engines disclosed here are contemplated for use in gas compression. Thus, the internal combustion engines can be used in stationary applications in some examples. In other applications the internal combustion engines disclosed can be used with vehicles and machinery that include those related to various industries, including, as examples, oil exploration, construction, agriculture, forestry, transportation, material handling, waste management, etc.

The engine 100 can include a system 102 with at least one oil separation device 104 (array of a plurality of oil separation devices 104 shown). The system 102 can include auxiliary components 106 to the engine 100 such as a regulator 108, jet pump 110 and a check valve 112. The check valve 112 can be placed, for example, at the bottom of the oil drain sub-system to prevent unfiltered blow-by gas from bypassing a coalescing filter of the oil separation device 104 and passing directly to a compressor 114. Thus, the check valve 112 can regulate the flow of oil.

In the example of FIG. 1, the system 102 can be part of the original manufacture of the engine 100 or can be a retrofitted system that is added to the engine 100 during maintenance, upgrade or the like. As will be discussed in further detail subsequently, the system 102 can use the oil separation device(s) 104 to filter oil from the blow-by gas to reduce volatile content in the blow-by gas.

The system 102 can be part of a purge system, which can be in fluid communication with a crankcase 101 of the engine 100 such as via an inlet passageway. The system 102 can be configured to supply air to the crankcase and through the engine block or through other components (not shown) to a cylinder head of the engine 100. The air the system 102 supplies can act to ventilate the crankcase 101 and other components of the engine 100 such as the cylinder head, the rocker box, etc. This ventilation, in addition to operation of the oil separation device(s) 104 to separate oil from the blow-by gas, can dilute un-combusted fuel, explosive gases and/or volatiles below a lower explosive limit so as to prevent or reduce the likelihood of an explosion within the engine 100.

The system 102 can include connected passages (some specifically illustrated by arrows and numbered in FIG. 1) that are in fluid communication with various components of the system 102. Some components of the engine 100 such as the engine block, the crankcase 101, the cylinder head, the rocker box, the valve cover and/or the breather can be in fluid communication. The terms "passage", "passages", "passageway", "passageways", "line" or "lines" as used herein should be interpreted broadly. These terms can be features defined by the various components of the engine illustrated in the FIGURES or can be formed by additional components (e.g., a hose, tube, pipe, manifold, cavity etc.) as known in the art. These additional components can be external to the engine 100 in some examples. Passageways can also connect the regulator 108, the jet pump 110 and the check valve 112 with selected parts of the oil separation device(s) 104 as further described herein.

The system 102 can include passages and other components such as those shown in FIG. 1. Dirty blow-by gas containing oil and volatiles of the system 102 can pass along a passage 103A from a breather or other device of the engine 100 and can pass to the oil separation device(s) 104 for filtering of oil to reduce volatile content of the blow-by gas. The blow-by gas, after filtering of the oil, can pass from the oil separation device(s) 104 along passage 103B to the regulator 108 (e.g., a vacuum control valve, mechanical valve or similar regulating device) located between the oil separation device(s) 104 and the jet pump 110. The blow-by gas can pass from the regulator 108 to the suction of the jet pump 110. The regulator 108 (e.g., the vacuum control valve) can be in fluid communication with the blow-by gas. The regulator 108 can be configured to regulate a flow of the blow-by gas to control a vacuum of the jet pump 110.

In tandem with the blow-by gas, the system 102 can utilize boost air from the compressor 114 (or other component such as a turbocharger) and/or air from an aftercooler 116, which moves along passage 103C. This boost air can be mixed in a desired ratio and passed through one or more jackets of the oil separation device(s) 104. Such arrangement can keep the filter of each of the oil separation device(s) 104 at between about 80 degrees Celsius and 120 degrees Celsius, for example. The boost air can be mixed to achieve a temperature range above the dew point temperature of the blow-by gas and below a temperature at which one or more components of the oil separating apparatus become inoperable (fail due to melting or other modality). However, other examples contemplate the use of alternative fluids, fluid temperatures and/or other configurations for the system 102. For example, the system 102 can utilize another fluid such as engine coolant or engine lube oil can be circulated by a pump 105 from a source 107 to the jacket of the oil separating apparatus 104.

After leaving the jacket(s), the boost air, now at a reduced pressure and temperature from a pressure and temperature leaving the engine 100, can pass along passage 103D to an input of the jet pump 110. The jet pump 110 can use the boost air as motive air for drawing the blow-by gas through the oil separation device(s) 104. The blow-by gas after leaving the oil separation device(s) 104 can be routed to a suction port of the jet pump 110. The boost air can be routed to an inlet port of the jet pump 110. The blow-by gas and the boost air can be combined in the jet pump 110. In particular, jet pump 110 can be configured to pass the blow-by gas and the boost air through a venturi of the jet pump 110. Some or all of the combined motive air and blow-by gas can pass along passage 103E to be returned to the engine 100, for example as an inlet to the compressor 114. Some or all of the combined motive air and blow-by gas can also be routed to ambient. The air can pass to the compressor 114, which can be configured to receive and compress the air. The compressed air can pass from the compressor 114 to the aftercooler 116. Thus, the aftercooler 116 can be in fluid communication with the compressor 114. The aftercooler 116 can be configured to receive and cool at least a portion of the compressed air.

To briefly summarize, the crankcase 101 can having a blow-by gas passing therethrough. The oil separation device(s) 104 can be in fluid communication with the blow-by gas and configured to separate oil from the blow-by gas. A mass flow rate of the boost air can be between 0.5% and 2.5% of a mass flow rate of the air received by the compressor 114. The boost air can be passed through the oil separation device(s) 104 in a heat exchange relationship with the blow-by gas to maintain a temperature of the blow-by gas within the oil separation device(s) 104 at a desired temperature range. The system 102 can include the jet pump 110 can be in fluid communication with both the blow-by gas after leaving the oil separation device(s) 104 and the boost air after leaving the oil separation device(s) 104. The jet pump can be configured to combine the blow-by gas and the boost air. After leaving the jet pump, the combined blow-by gas and the boost air can be routed to at least one of the compressor 114 or ambient.

Put another way, the system 102 can be configured to ratio compressor outlet boost air with aftercooler output air. This ratio of air can target a temperature somewhere between 80 degree Celsius to 120 degrees Celsius. Thus, the compressed air from the compressor 114 and cooled air from the aftercooler 116 can be mixed to achieve boost air at a temperature range of between 80° C. and 120° C., inclusive. This mixture of air can be fed to the jacket of each of the oil separation device(s) 104 the keep the filter of each of the oil separation device(s) 104 at between about 80 degrees Celsius and 120 degrees Celsius, for example. This mixture of air, after passing through the jacket of the oil separation device(s) 104, can be fed to the jet pump 110 as motive air. Passage of the motive air through the jet pump 110 can create a vacuum that can be modulated by the regulator 108 (e.g., vacuum control valve or a mechanical valve). The regulator 108 can modulate the vacuum at the outlet of the system 102 and can regulate crankcase pressure (via flow of blow-by gas to the suction of the jet pump 110). Additionally, the filter(s) of the oil separation device(s) 104 is heated, cooled or maintained at a desired temperature using the boost air.

FIG. 2 shows an example of the oil separation device 104 that can be used with the system 102 described previously. FIG. 2A shows an exploded view of components of the oil separation device 104. As shown in FIG. 2A, the oil separation device 104 can include a first cover 202, an outer housing 204, an inner housing 206, a coalescing filter 207 and a second cover 208. Referring now to FIGS. 2 and 2A, the first cover 202 can include an insulative material 210 and a main body 212. Referring now to FIG. 2, the outer housing 204 can include one or more ports 214. As shown in FIGS. 2 and 2A, the second cover 208 can include an insulative material 218, a service plug 220 (FIG. 2A) and a main body 222.

As shown in FIG. 2, the first cover 202 can be connected to a first end portion of the outer housing 204 by fastener, weld, solder, threading or other mechanical connection as known in the art. Similarly, the second cover 208 can be connected to a second end portion of the outer housing 204 in a similar manner to the first cover 202. The second end portion can generally oppose the first end portion.

The first cover 202 and/or the second cover 208 can be part of the outer housing 204 according to further examples rather than being a separate component. For example, the outer housing 204, the first cover 202 and/or the second cover 208 could comprise an integral single piece assembly according to some examples.

The first cover 202 and the second cover 208 can have a square, rectangular, circular, or other shape in cross-section as desired and can be constructed of any suitable material(s). The main body 212 can form exterior walls, faces, one or more manifolds and other features of the first cover 202. In brief, the main body 212 can be configured to form a plurality of ports for communication of blow-by gas into or out of the oil separation device 104. These ports and other features will be discussed and illustrated in further detail subsequently. The insulative material 210 can abut or be in close proximity to and extend over one or more sides of the main body 212 such as at an end thereof. The insulative material 210 can be held in place with mechanical fasteners, a plate (shown in FIGS. 2 and 2A) and/or other feature or components. According to one example, the insulative material 210 can be a fiberglass insulation encapsulated within a stainless steel foil, or a steel outer shell with an integral foam insulative underlayer.

Figure 2C:
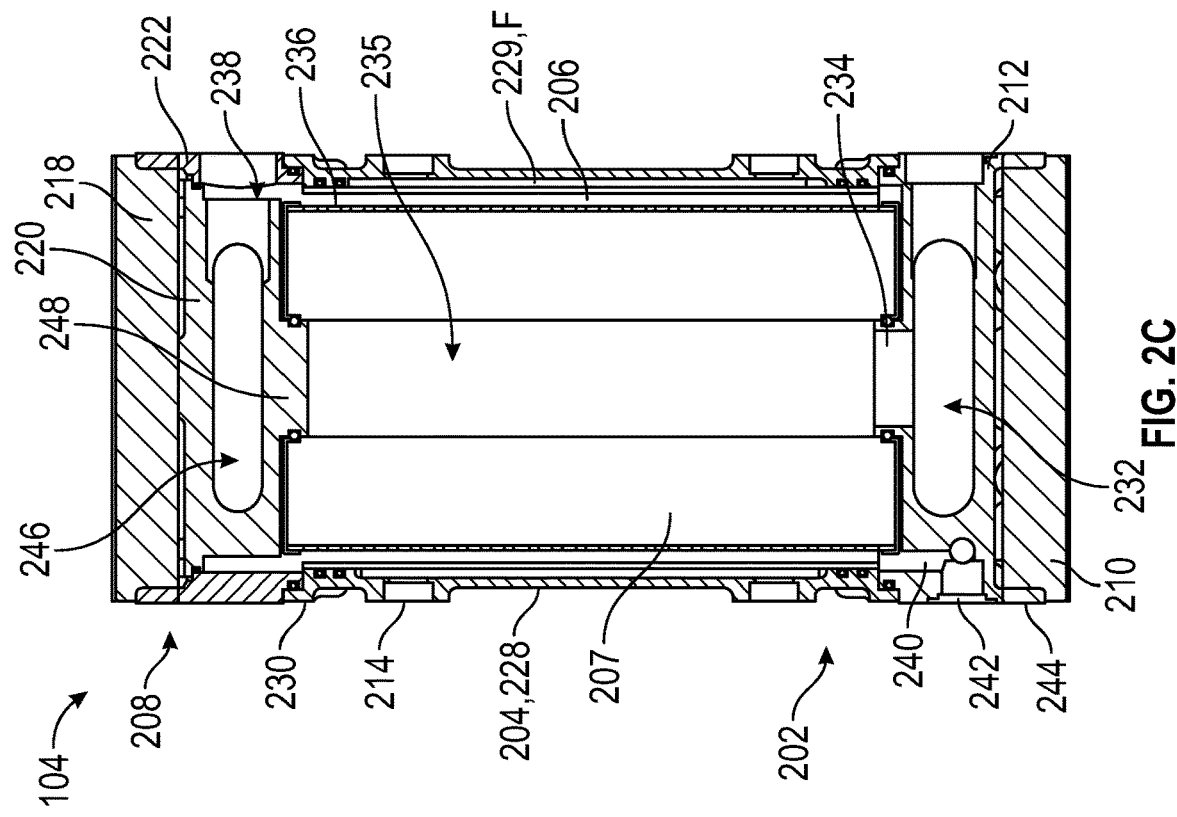
FIG. 2C is a second cross-sectional view of the oil separation device of FIG. 2.
Figure 2B:
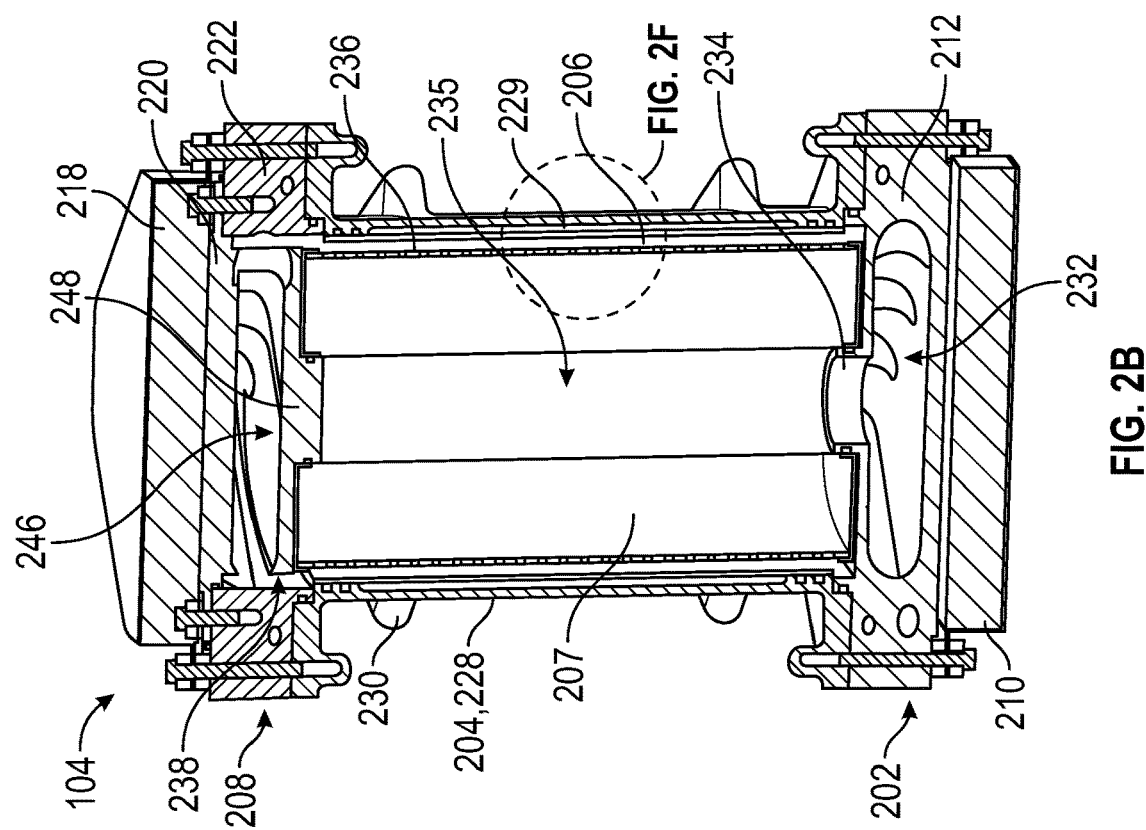
FIG. 2B is a first cross-sectional view of the oil separation device of FIG. 2.

The outer housing 204 can have a hollow tubular shape, for example. This shape can form an inner cavity configured to receive the inner housing 206. Thus, the inner housing 206 can be positioned within the outer housing 204. The inner housing 206 and the outer housing 204 can be constructed of suitable material(s). Although the outer housing 204 and the inner housing 206 are illustrated as separate components in the FIGURES, it is contemplated in some examples that these could be integrally formed as a single piece such as by casting or another forming technique. The outer housing 204 can form a wall 228 with the ports 214 passing through the wall 228. These ports 214 can provide inlet(s) or outlet(s) as desired and can be in fluid communication with a jacket 229 (FIGS. 2B, 2C and 2F). The jacket 229 can comprise a sealed (from the inner cavity, the blow-by gas, oil and coalescing filter 207) cavity formed between an interior side of the wall 228 of the outer housing 204 and an outer surface of the inner housing 206 (see FIGS. 2B, 2C and 2F). The ports 214 can be located at specifically configured flanges 230 or other features of the outer housing 206. Thus, the jacket 229 can be formed between the inner housing 206 and the outer housing 204. The flanges 230 can form different faces of the outer housing 206. These faces of the outer housing 206 can correspond with faces of the first cover 202 and/or the second cover 208 as further discussed subsequently.

Returning to the jacket 229, the jacket 229 can be cylindrically shaped having only the ports 214 for fluid communication. The jacket 229 can be configured to receive one or more of an electrical heater coil C (FIG. 2D), an insulative material (I in FIG. 2E), a sealed air gap, or a positive mass flow of pressurized engine boost air, engine coolant, or engine lube oil. More particularly, electrically resistive heating coils can be placed in the jacket 229 as shown in FIG. 2D so as to provide heating to the inner housing 206 and the coalescing filter 207. This can be useful if the oil separation device 104 is being operated in a cold environment. Alternatively or additionally, insulative material such as foam or the like can be placed in the jacket 229 as shown in FIG. 2E to provide for insulation of the coalescing filter 207 (and blow-by gas) from a harsh environment. The jacket 229 can also receive in addition or alternative to the heating coil and/or insulation, a fluid (F as shown in FIG. 2C) that can be used for heating or cooling the coalescing filter 207 (and the blow-by gas). Such fluid can be anyone or combination of a sealed air gap, or a positive mass flow of pressurized engine boost air, engine coolant, or engine lube oil, for example. However, the fluid is not limited to these examples.

The main body 222 can form exterior walls, faces, one or more manifolds and other features of the second cover 208. The main body 222 can be configured to form a plurality of ports for communication of blow-by gas into or out of the oil separation device 104. These ports will be discussed and illustrated in further detail subsequently. The service plug 220 can be configured to couple with the main body 222 and can be selectively removable therefrom. The service plug 220 can allow access to an inner cavity (formed by the inner housing 206) and the coalescing filter 207. The coalescing filter 207 can be removed and changed for a new filter with selective removal of the service plug 220 from the main body 222. This process is further illustrated in FIG. 7. The insulative material 218 can abut or be in close proximity to and extend over one or more sides of the main body 222 and the service plug 220. The insulative material 218 can be held in place with mechanical fasteners, a plate (shown in FIGS. 2 and 2A) and/or other features or components in a manner similar to that if the insulative material 210 of the first cover 202. The insulative material 218 can be identical to or can differ from the insulative material 210, in regard to shape, size or composition.

FIGS. 2B and 2C show different cross-sections of the oil separation device 104. FIGS. 2B and 2C show the first cover 202, the outer housing 204, the inner housing 206, the coalescing filter 207, the second cover 208 and other aspects including internal features and aspects of the oil separation device 104.

The first cover 202 can couple to the outer housing 204 so as to abut or be in close proximity to the coalescing filter 207. The inner housing 206 can be positioned within the outer housing 204 and can be sealed thereto. The inner housing 206 can comprise a sleeve having a hollow construction forming an inner cavity 231 (FIG. 2A) for receiving the coalescing filter 207.

As shown in FIGS. 2B and 2C, the first cover 202, specifically the main body 212, can form a first manifold 232 internally. The first manifold 232 can be in fluid communication with a plurality of ports (discussed further in reference to FIGS. 3A-3C). The first manifold 232 can include a central port 234 that allows for fluid communication between the first manifold 232 and a central passage 235 of the coalescing filter 207.

The blow-by gas passing through the central passage 235 can carry oil from the engine and/or from the crankcase. The coalescing filter 207 is configured to separate a portion of the oil contained in the blow-by gas. The coalescing filter 207 can have a generally cylindrical shape about the central passage 235. The coalescing filter 207 can have a construction known in the art. As an example, the coalescing filter 207 can be constructed using a single or multi-layer synthetic coalescing filter media wound around a core, or pleated. In addition to the coalescing filter media, the coalescing filter will also include end caps and associated seals and may include an inner and outer perforated tube structure to provide the axial, torsional, and bending stiffness required for the application.

The blow-by gas containing oil can pass radially outward through the coalescing filter 207 to an outer circumference thereof. During such passage, the configuration of the coalescing filter 207 can cause coalescing of the oil from the blow-by gas. Such coalescing can result in separation of the oil from the blow-by gas. The oil once coalesced can travel to the outer circumference of the coalescing filter 207 and can pass to an outer cavity 236 surrounding the outer circumference of the coalescing filter 207. The inner housing 206 can be spaced from the outer circumference of the coalescing filter 207. This gap can be the outer cavity 236. The blow-by gas that is separated from the oil by action of the coalescing filter 207 can pass from the coalescing filter 207 into the outer cavity 236 and can pass from the outer cavity 236 through one or more passages 238 (FIG. 2C) in fluid communication with the outer cavity 236 into the second cover 208. These one or more passages 238 can be relatively extensive, communicating with the outer cavity 236 around substantially all (over 90%), most (60%-89%), a majority (50%-59%), some (25%-49% or part (5%-24%) of the outer circumference of the coalescing filter 207. The one or more passages 238 can be at least partially formed by a gap between the main body 222 and the service plug 220, for example. Other examples contemplate the one or more passages 238 being formed by dedicated apertures or other features in only one of the main body 222 and the service plug 220.

As shown in FIG. 2C, the outer cavity 236 can be in fluid communication with one or more passages 240 at an opposing end of the outer cavity 236 from the one or more passages 238. The one or more passages 240 can drain oil from the outer cavity 236 into the first cover 202. The one or more passages 240 can be at least partially formed by the main body 212 of the first cover 202. The one or more passages 240 can be separated from the first manifold 232 and can have an outlet port 242. This outlet port 242 can be located on one or more of the faces of the main body 212 such as a first face 244. Thus, the main body 212 can form the outlet port 242 and at least a portion of the one or more passages 240. The one or more passages 240 can be configured to receive the oil captured (separated by action of) by the coalescing filter 207 and can pass the oil as a drainage out of the oil separation device 104 at the outlet port 242.

The blow-by gas free from at least a portion of the oil therein by action of the coalescing filter 207 can pass through the one or more passages 238 into a second manifold 246 of the second cover 208. This second manifold 246 can be at least partially formed by the service plug 220 in addition to parts of the main body 222. The second manifold 246 can be in fluid communication with a plurality of ports (discussed further in reference to FIGS. 5-6D).

As shown in FIGS. 2B and 2C, the service plug 220 can be arranged atop and abutting or in close proximity to the coalescing filter 207. The service plug 220 can include a projection 248 or other sealing feature configured to seal the central passage 235 of the coalescing filter 207.

Figure 3A:
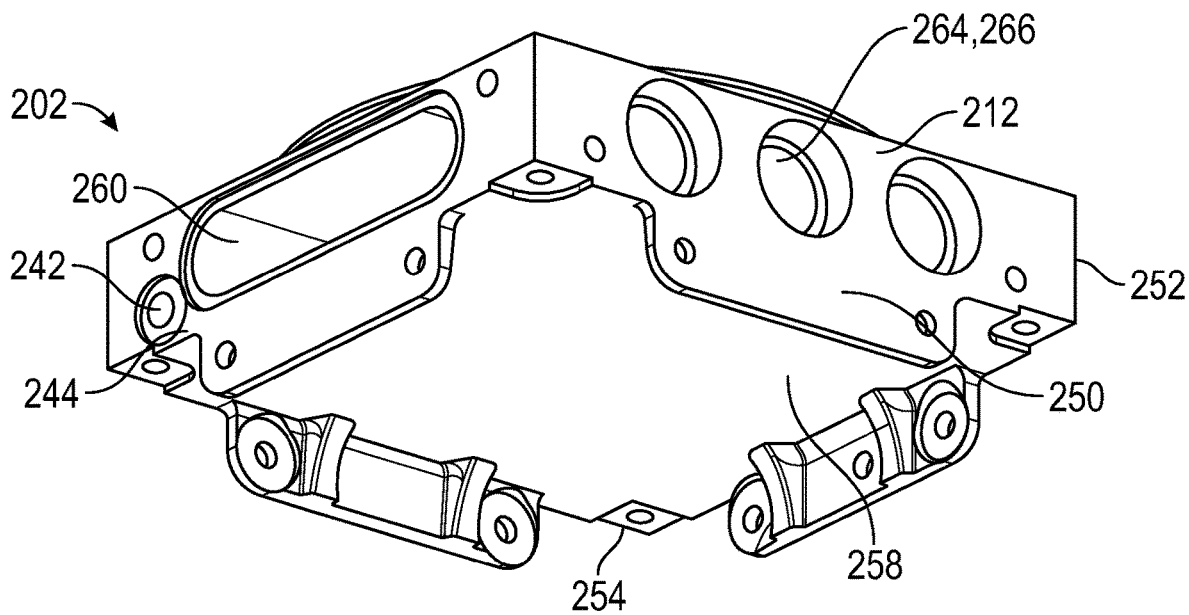
FIGS. 3A and 3B show various perspective views of a first cover of the oil separation device of FIG. 2 according to one example of the present application.
Figure 3B:
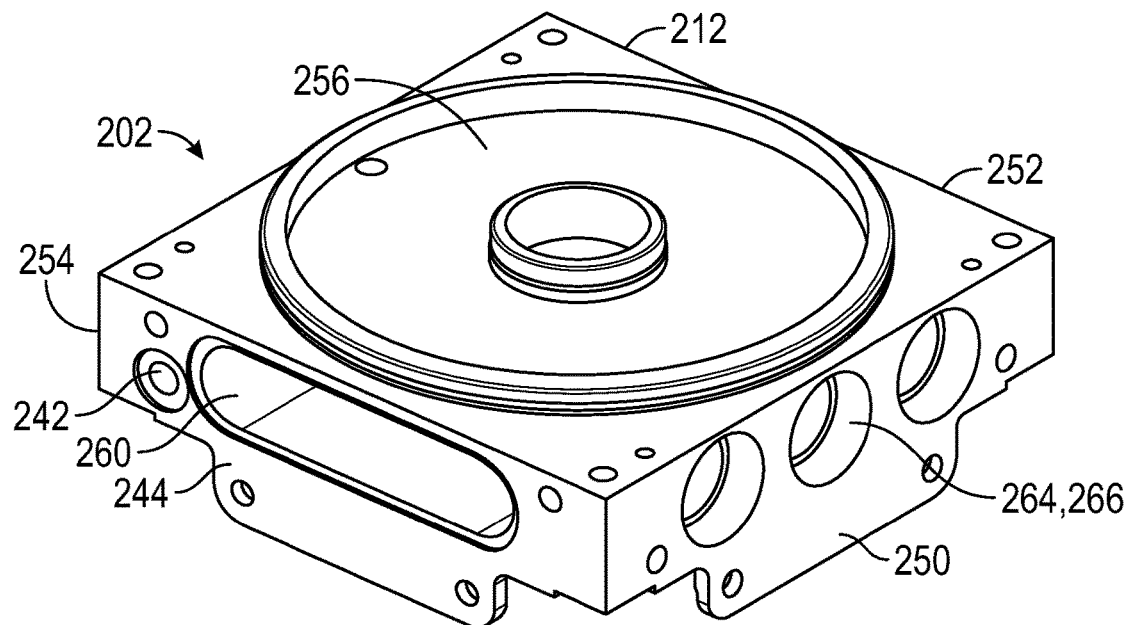
Figure 3C:
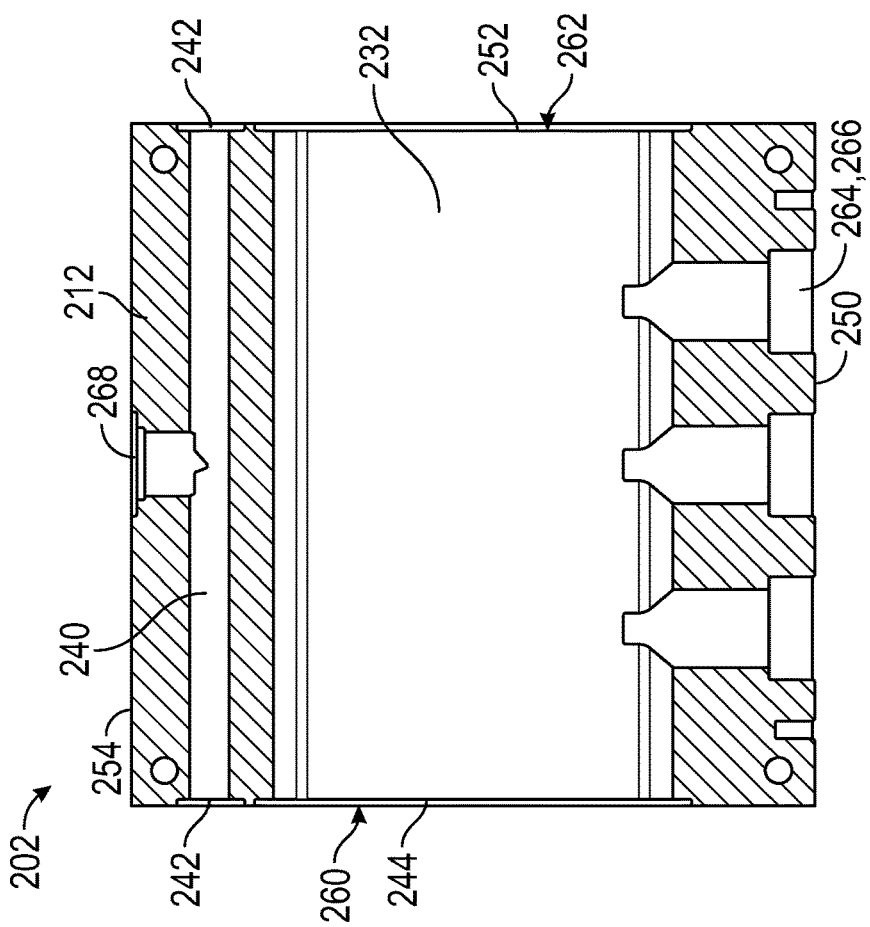
FIG. 3C is a cross-sectional view of the first cover of FIG. 3B.

FIGS. 3A-3C show aspects of the first cover 202, specifically the main body 212. FIG. 3C is a cross-section of the main body 212 showing the first manifold 232 and the one or more passages 240.

FIGS. 3A-3C show the first face 244 with the outlet port 242 for oil drainage. The main body 212 has a square cross-sectional construction according to the example shown. However, other cross-sectional shapes (circular, triangle, rectangle, pentagon, quadrilateral, hexagon, octagon, etc.) are also contemplated. A hybrid or non-symmetric shape can also be utilized.

Referring now selectively between FIG. 3B and FIG. 3C, the main body 212 can include a second face 250, a third face 252, a fourth face 254, a first end wall 256 (FIG. 3B), a second end wall 258 (FIG. 3B), a first port 260, a second port 262, a first plurality of flow passages 264 and a first plurality of ports 266.

The first face 244, the second face 250, the third face 252, the fourth face 254, the first end wall 256, the second end wall 258 (FIG. 3C) can have a unitary construction being formed by casting or other integral construction. The faces 244, 250, 252 and 254 can be generally substantially flat. However, the faces 244, 250, 252 and 254 can have other features such as curvatures, mating features and other connection mechanisms such as recesses, threaded apertures, etc. The first face 244 is connected to the second face 250, the fourth face 254, the first end wall 256 and the second end wall 258. Similarly, the second face 250 can be connected to the first face 244, the third face 252, the first end wall 256 and the second end wall 258. The third face 252 can generally oppose the first face 244 spaced by the first manifold 232, the first end wall 256 and the second end wall 258. The third face 252 can be connected to the second face 250, the fourth face 254, the first end wall 256 and the second end wall 258. The first end wall 256 can be spaced from the second end wall 258 by the first manifold 232 (FIG. 3C) in addition to the first face 244, the second face 250, the third face 252 and the fourth face 254.

FIGS. 3A-3C show the first face 244 can be arranged substantially perpendicular to the second face 250. The first face 244 can have the first port 260 in fluid communication with the first manifold 232 (FIG. 3C). The second face 250 can form the first plurality of flow passages 264 and the first plurality of ports 266.

The third face 252 can oppose the first face 244 spaced by the second face 250 and the fourth face 254. The third face 252 can be symmetrically shaped with respect to the first face 244. Thus, the second port 262 can be similarly shaped and sized with respect to the first port 260, for example. The second port 262 can be in fluid communication with the first manifold 232 in a similar manner to the first port 260 but opening in an opposing direction.

The second face 250 can differ in construction from the fourth face 254, the first face 244 and the third face 252. In particular, the second face 250 can include the first plurality of flow passages 264 and the first plurality of ports 266 while the fourth face 254 does not include any flow passages or ports communicating with an exterior for passage of blow-by gas. The fourth face 254 can include a passage and/or port 268 that can be part of or in fluid communication with the one or more passages 240 according to some examples. However, it is contemplated in some examples that the second face 250 and the fourth face 254 could share a same or similar construction including similar flow passages. The second face 250 and/or the fourth face 254 can have a same geometry as the first face 244 and the third face 252 according to further examples.

According to one example the first port 260, second port 262 and/or the first plurality of ports 266 can be configured to receive the blow-by gas into the oil separation device 104. However, it is contemplated that the flow direction of the blow-by gas through the oil separation device 104 can be reversed in further examples such that the first port 260, the second port 262 and/or the first plurality of ports 266 could be an outlet for the blow-by gas. The first port 260, the second port 262 and/or any one or combination of the first plurality of ports 266 can be selectively blocked from receiving blow-by gas with a cover, plug, plate or other feature to close the respective port according to some examples.

FIG. 3A shows the second end wall 258 on an outer side can be configured with flanges, recess, cavity, apertures etc. to receive and retain the insulative material 210 (FIGS. 2-2C). FIG. 3B shows the first end wall 256 on a side facing the outer housing 204, the inner housing 206, the coalescing filter 207 (FIGS. 2-2C) can have features such as lips, port, one or more apertures to facilitate passage of blow-by gas, or other features for sealing and retention of the first cover 202 to the outer housing 204, the inner housing 206, the coalescing filter 207.

Figure 4A:
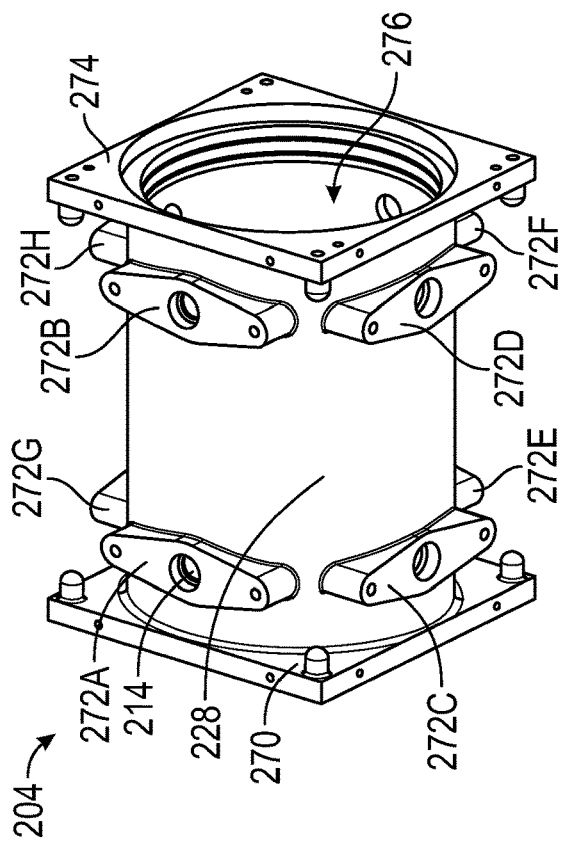
FIG. 4A is a perspective view of an outer housing of the oil separation device of FIG. 2 according to one example of the present application.

FIG. 4A illustrates the outer housing 204 according to one example. The outer housing 204 includes a first mounting flange 270, the wall 228, flanges 230 (referred to as one or more jacket flanges 272A, 272B, 272C, 272D, 272E, 272F, 272G and 272H below), ports 214 and a second mounting flange 274. These features can have a unitary construction being formed by casting or other integral construction.

The first mounting flange 270 can be configured for mounting to the first cover 202. Thus, the first mounting flange 270 can be designed to seat down and abut against the second end wall 258 (FIG. 3B), for example. The first mounting flange 270 can include sides that are shaped and sized to correspond with the shape and size of the first face 244, the second face 250, the third face 252, and/or the fourth face 254 (FIG. 3C).

The wall 228 can be connected to the first mounting flange 270 and the second mounting flange 274. The wall 228 can be generally cylindrical in shape, however, other exterior (or interior) shapes are contemplated. The wall 228 can form a relatively thin sleeve type structure and can define a hollow interior 276 (a portion of which is the outer cavity 236 discussed previously). The hollow interior 276 can be configured to receive the inner housing 206 and the coalescing filter 207 (FIGS. 2-2C) as previously discussed and illustrated.

The one or more jacket flanges 272A, 272B, 272C, 272D, 272E, 272F, 272G and 272H can project from the wall 228 and can comprise coupling features for sealing and/or facilitating communication to the jacket as further discussed. The jacket flanges 272A, 272B, 272C, 272D, 272E, 272F, 272G and 272H can project a distance that is similar to the sides of the first mounting flange 270, the second mounting flange 274 and/or the faces of the first and second covers 202, 210. This allows for direct interfacing of the jacket flanges 272A, 272B, 272C, 272D, 272E, 272F, 272G and 272H with other jacket flanges or other components as further discussed subsequently. The orientation of the jacket flanges 272A, 272B, 272C, 272D, 272E, 272F, 272G and 272H can correspond to the first face 244, the second face 250, the third face 252, the fourth face 254 (FIG. 3C). More particularly, the jacket flanges 272A and 272B can have an orientation and construction such that an outer surface thereof is generally parallel with and/or on a same plane with the first face 244 (see FIG. 2, for example). Similarly, the jacket flanges 272C and 272D can have an orientation and construction such that an outer surface thereof is generally parallel with and/or on a same plane with the second face 250 (see FIG. 2C, for example). Likewise, the jacket flanges 272E and 272F can have an orientation and construction such that an outer surface thereof is generally parallel with and/or on a same plane with the third face 252. The jacket flanges 272G and 272H can have an orientation and construction such that an outer surface thereof is generally parallel with and/or on a same plane with the fourth face 254 (see FIG. 2C, for example).

The ports 214 can provide for communication into the jacket 229 through the wall 228 and the jacket flanges 272A, 272B, 272C, 272D, 272E, 272F, 272G and 272H. The ports 214 can be located at one or more of the jacket flanges 272A, 272B, 272C, 272D, 272E, 272F, 272G and 272H.

The second mounting flange 274 can be configured for mounting to the second cover 208. Thus, the second mounting flange 274 can be designed to seat down and abut against the second cover 208, for example. The second mounting flange 274 can include sides that are shaped and sized to correspond with the shape and size of faces of the second cover 208.

Figure 4B:
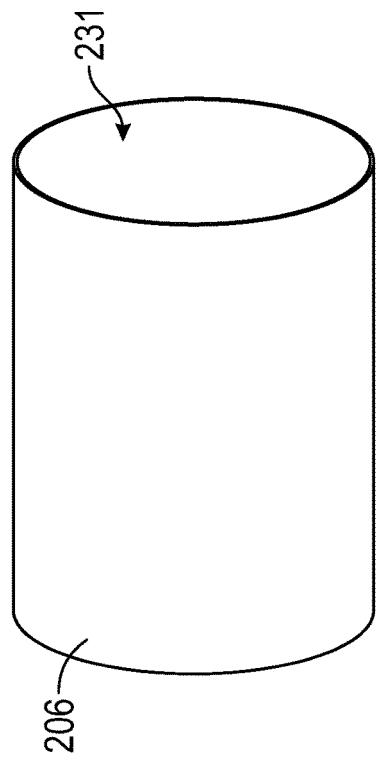
FIG. 4B is a perspective view of an inner housing of the oil separation device of FIG. 2 according to one example of the present application.

FIG. 4B shows the inner housing 206. This can be configured to be positioned within the outer housing 204 and can be sealed thereto thereby forming the jacket as previously discussed. The inner housing 206 can comprise a sleeve having a hollow construction forming the inner cavity 231 for receiving the coalescing filter 207 (FIGS. 2A-2C).

Figure 5:
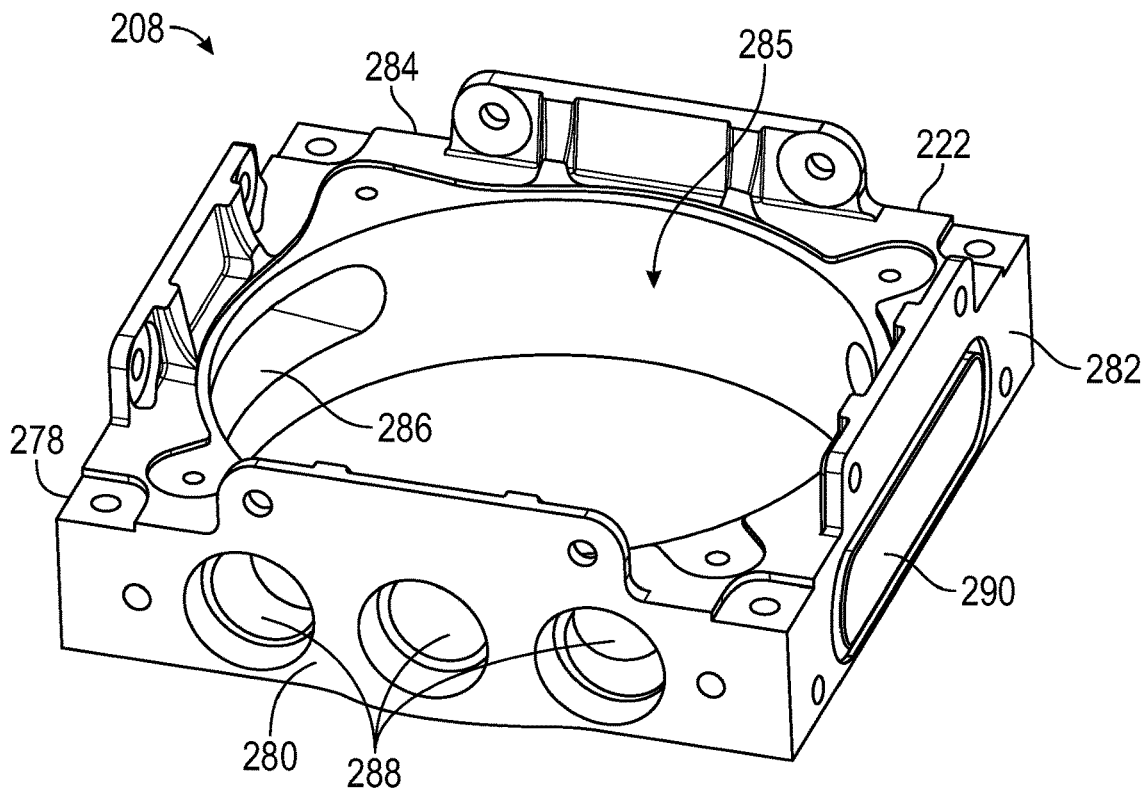
FIG. 5 is a perspective view of a first portion of a second cover of the oil separation device of FIG. 2 according to one example of the present application.

FIG. 5 shows the main body 222 of the second cover 208 according to one example. The main body 222 can have an open frame design with a first face 278, a second face 280, a third face 282, a fourth face 284 and a central opening 285. The first face 278 can have a first port 286. The second face 280 can have a second plurality of ports 288. The third face 282 can have a second port 290.

The main body 222 can have an exterior shape that substantially matches the main body 212 (FIGS. 3A-3C), for example. Thus, the main body 222 can have a square cross-sectional construction of a same size as that of the main body 212, according to the example shown. However, other cross-sectional shapes that differ from the main body 212 and other shapes in general (circular, triangle, rectangle, pentagon, quadrilateral, hexagon, octagon, etc.) are also contemplated. A hybrid or non-symmetric shape can also be utilized.

The main body 222 can have an open shell type configuration with the central opening 285 configured to receive the service plug 220 (FIGS. 6A-6E). Thus, the main body 222 can differ in construction from the main body 212 in that it does not have the first end wall 256, the second end wall 258 (FIG. 3B). The first face 278, the second face 280, the third face 282 and the fourth face 284 can have a unitary construction being formed by casting or other integral construction. The faces 278, 280, 282 and 284 can be generally substantially flat. However, the faces 278, 280, 282 and 284 can have other features such as curvatures, mating features and other connection mechanisms such as recesses, threaded apertures, etc. The first face 278 is connected to the second face 280, the fourth face 284. Similarly, the second face 280 can be connected to the first face 278 and the third face 282. The third face 282 can generally oppose the first face 278 spaced by the central opening 285 and service plug 220 (not shown). The third face 282 can be connected to the second face 280 and the fourth face 284.

FIG. 5 shows the first face 278 can be arranged substantially perpendicular to the second face 280. The first face 278 can have the first port 286 in fluid communication with the central opening 285 and the service plug 220 (when inserted therein). The second face 280 can form the second plurality of ports 288.

The third face 282 can oppose the first face 278 spaced by the second face 280 and the fourth face 284. The third face 282 can be symmetrically shaped with respect to the first face 278. Thus, the second port 290 can be similarly shaped and sized with respect to the first port 286, for example. The second port 290 can be in fluid communication with the central opening 285 (and the service plug 220 when inserted therein) in a similar manner to the first port 286 but opening in an opposing direction.

The second face 280 can differ in construction from the fourth face 284. In particular, the second face 280 can include the first plurality of ports 288 while the fourth face 284 does not include any flow passages or ports communicating with an exterior for passage of blow-by gas. However, it is contemplated in some examples that the second face 280 and the fourth face 284 could share a same or similar construction including similar flow passages. Additionally, one or more of the second face 280 and/or fourth face 284 could have a same geometry as the first face 278 and/or the third face 282.

The first port 286, second port 290 and/or the second plurality of ports 288 can be configured as outlets to pass the blow-by gas from the oil separation device 104 back toward the engine and/or other auxiliary components. However, it is contemplated that the flow direction of the blow-by gas through the oil separation device 104 can be reversed in further examples such that the first port 286, the second port 290 and/or the second plurality of ports 288 could be an inlets for the blow-by gas. The first port 286, the second port 290 and/or any one or combination of the second plurality of ports 288 can be selectively blocked from receiving blow-by gas with a cover, plug, plate or other feature to close the respective port according to some examples.

FIG. 5 shows a top portion of the main body 222 on an outer side can be configured with flanges, recess, apertures etc. to receive and retain the insulative material 218 (FIGS. 2-2C) and the service plug 220 (FIGS. 6A-6E).

Figure 6A:
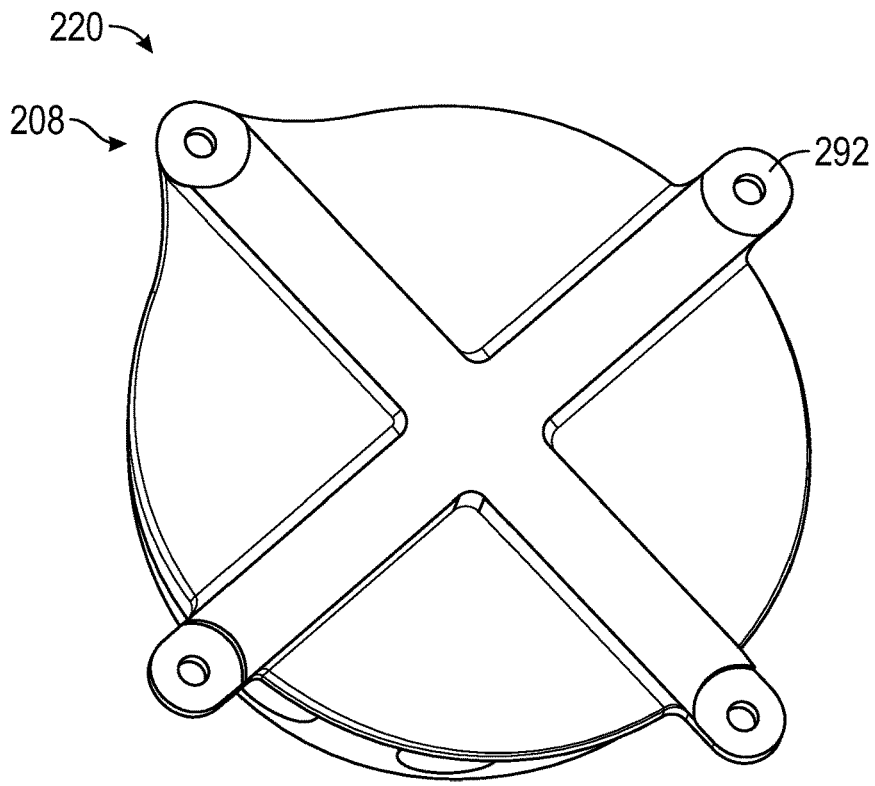
FIG. 6A is a perspective view of a second portion of the second cover of the oil separation device of FIG. 2 according to one example of the present application.
Figure 6B:
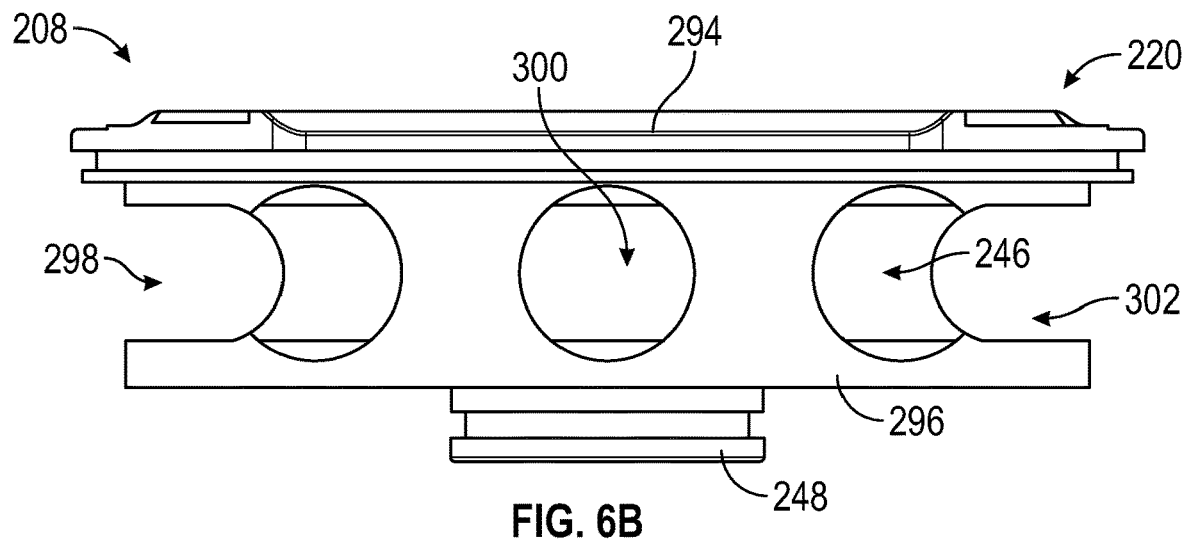
FIGS. 6B-6E show plan views of the second portion of the second cover according to one example of the present application.
Figure 6C:
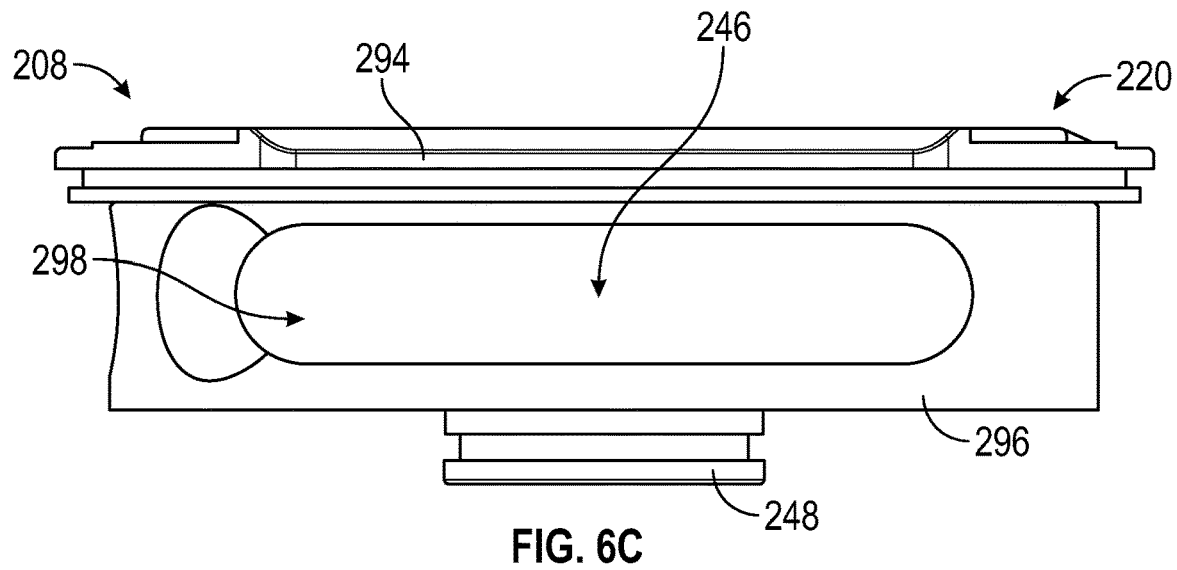
Figure 6D:
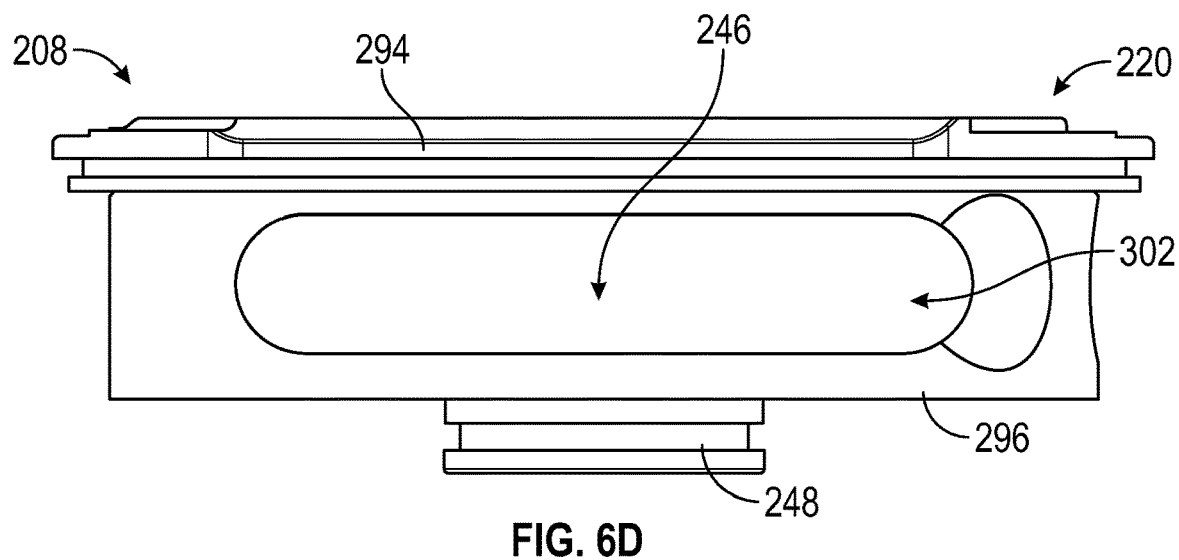
Figure 6E:
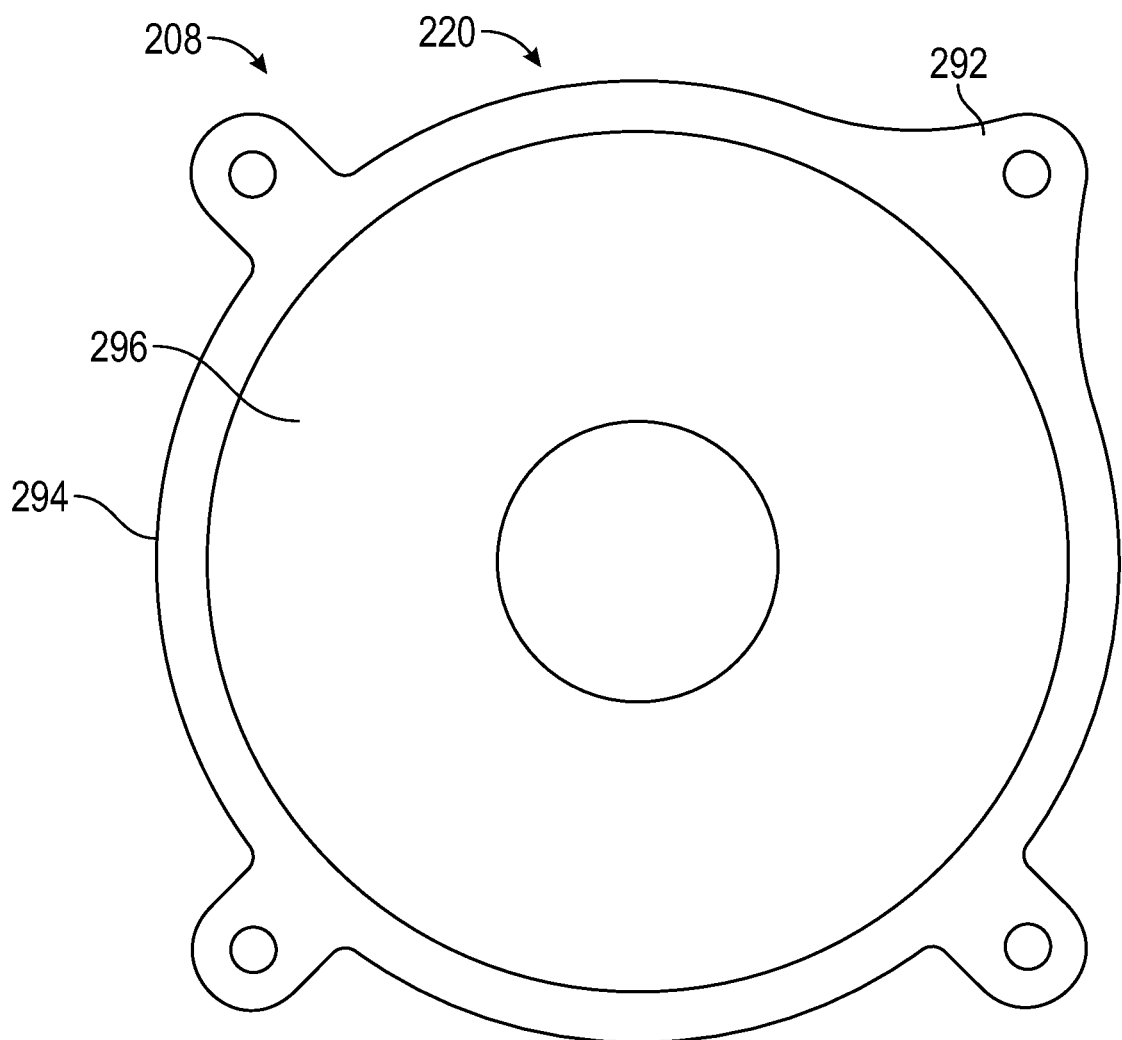

FIGS. 6A-6E show further details of the service plug 220. Referring now to FIG. 6B, the service plug 220 can include the second manifold 246, the projection 248, coupling features 292 (FIGS. 6A and 6E), a first end wall 294, a second end wall 296, a first passage 298, a second plurality of passages 300 and a second passage 302.

The service plug 220 can be selectively attachable to the main body 222 (FIG. 5) using the coupling features 292 and fasteners (not shown). The service plug 220 can be selectively removable from the main body 222 (see FIG. 7).

The service plug 220 can have a generally cylindrical shape with an open frame construction as a result of the second manifold 246, the first passage 298, the second plurality of passages 300 and the second passage 302. The first end wall 294 can generally oppose the second end wall 296 across the second manifold 246. The second manifold 246 can be generally centrally located in fluid communication with the first passage 298, the second plurality of passages 300 and the second passage 302. The first passage 298 can be on an opposing side of the service plug 220 from the second passage 302 spaced by the second manifold 246. The second plurality of passages 300 can be oriented at an angle (e.g., perpendicular) to the first passage 298 and/or the second passage 302.

The first passage 298 can oriented (so as to be aligned with) and sized to be in fluid communication with the first port 286 (FIG. 5). Similarly, the second passage 302 can be oriented (so as to be aligned with) and sized to be in fluid communication with the second port 290 (FIG. 5). The second plurality of passages 300 can be oriented (so as to be aligned with) and sized to be in fluid communication with the second plurality of ports 288.

As previously discussed, the service plug 220 can be spaced at some locations from the main body 222 (FIG. 5) as a result of the shape of the second end wall 296 being smaller as compared with the first end wall 294. This gap that results from the spacing of the service plug 220 from the main body 222 can provide for the one or more passages 238 (FIGS. 2B and 2C) as previously discussed.

Figure 7:
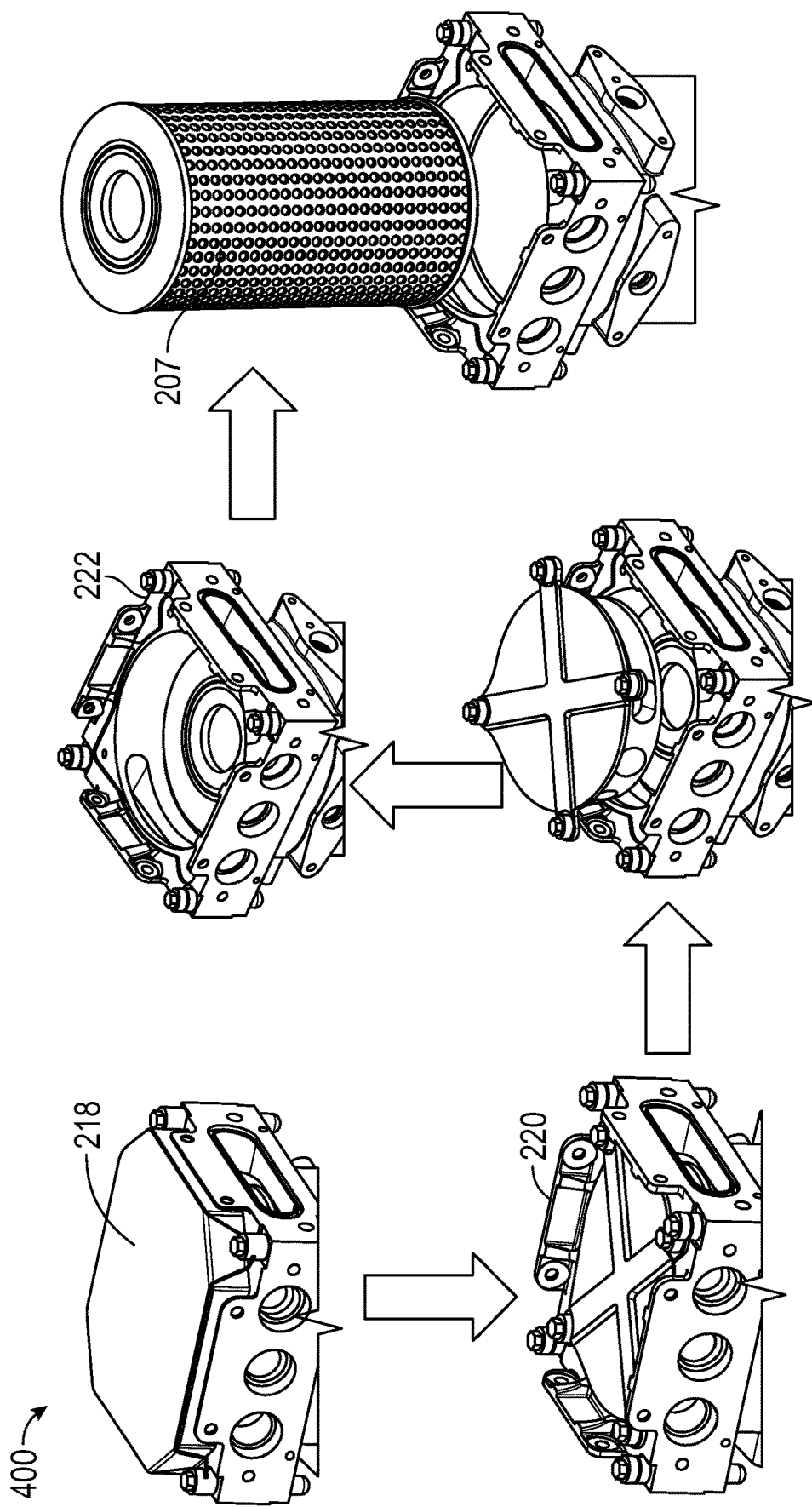
FIG. 7 is a schematic illustration of a process of accessing and removing an coalescing filter of the oil separation device of FIG. 2 according to one example of the present application.

FIG. 7 shows a method 400 whereby the coalescing filter 207 can be removed from the oil separation device 104 to be selectively cleaned or replaced. The method 400 removes the insulative material 218 to access the service plug 220. The service plug 220 is then selectively removed from the main body 222. This allows the coalescing filter 207 to be accessed and removed.

Figure 8:
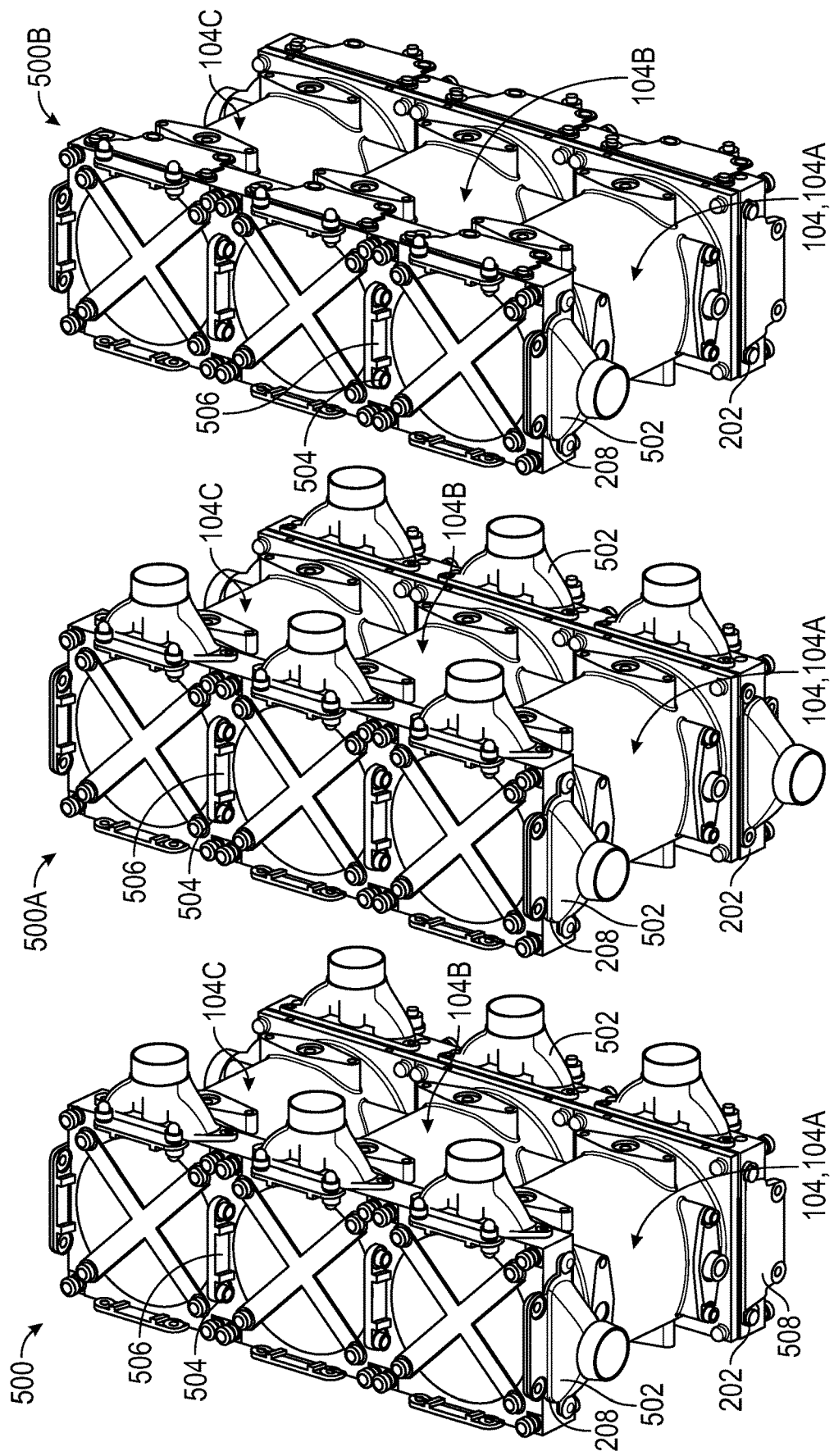
FIG. 8 shows an assembly of a plurality of oil separation devices arranged in a single row array with a first configuration according to one example of the present application.

FIGS. 8-8B show examples of single row arrays 500, 500A and 500B that can be created using a plurality of the oil separation devices 104 selectively coupled together.

More particularly, the single row arrays 500, 500A and 500B can each include three of the oil separation devices 104. The oil separation devices 104 can be in fluid communication with one another and/or in fluid communication with one or more blow-by gas coupling apparatuses 502.

The single row arrays 500, 500A and 500B can be created by selectively connecting a first oil separation device 104A at the third faces thereof with a second oil separation device 104B at the first faces thereof. The second oil separation device 104B can be connected to a third oil separation device 104C at the third face thereof. The first faces of the third oil separation device 104C can interface with the third faces of the second oil separation device 104B. The first oil separation device 104A can utilize one or more fasteners 504 that attach the respective abutting flanges 506 of the first oil separation device 104A and the second oil separation device 104B. Similarly, the second oil separation device 104B can utilize one or more fasteners 504 that attach the respective abutting flanges 506 of the second oil separation device 104B and the third oil separation device 104C. A similar arrangement of fasteners and flanges can be utilized with the first covers of the first, second and third oil separation devices 104A, 104B and 104C. Thus, the first oil separation device 104A can abut or can be spaced in close proximity to and can be coupled with the second oil separation device 104B along at least one face of the first cover 202 and at least one face of the second cover 208. The second oil separation device 104B can abut or be spaced a small distance from and can be coupled with the third oil separation device 104C along at least one face of the first cover 202 and at least one face of the second cover 208. The second oil separation device 104B and be abutted (or interfaced in close proximity) along at least two opposing faces as this component forms a middle of the arrays 500, 500A and 500B.

FIG. 8 shows an arrangement where a plate or cover 508 is used to selectively block flow of blow-by gas from particular ports of the first oil separation device 104A and the third oil separation device 104C. The blow-by gas coupling apparatuses 502 can be configured to allow for flow of blow-by gas to or from the array 500. A first end of the blow-by gas coupling apparatuses 502 can be configured to seat against and seal with a respective face of the particular oil separation device 104 where a flow of blow-by gas is desired. The blow-by gas coupling apparatuses 502 are hollow so as to form flow channels that communicate with one or more of the ports previously described. A second end of the blow-by gas coupling apparatuses 502 are configured for coupling to a hose, tube, line or other apparatus that communicates the blow-by gas to or from the engine or other auxiliary component.

It is noted in FIG. 8 that the blow-by gas coupling apparatuses 502 may be modified from those shown. As an example, the blow-by gas coupling apparatuses 502 may be made smaller so as to couple only to a single one or two of the plurality of ports along the second faces. Others of these plurality of ports may be selectively blocked so as not to be in fluid communication externally from the oil separation device 104. As another example, the number of the blow-by gas coupling apparatuses 502 can be modified from what is shown in FIG. 8. For example, only one of the oil separation devices 104 such as the second oil separation device 104B may have the blow-by gas coupling apparatuses 502 coupled with the second faces thereof. The first oil separation device 104A and the third oil separation device 104C may not utilize the blow-by gas coupling apparatuses 502 along the second faces thereof. Although three oil separation devices are shown in FIGS. 8-8B, arrays with relatively less (two) oil separation devices or relatively more (four or more) oil separation devices are contemplated for use together as an array. Thus, the number of oil separation devices shown in purely exemplary with the understanding that the number utilized will be dictated by blow-by gas flow rate capacity of an individual oil separation device 104, the blow-by gas flow rate produced by the engine over its useful life, any dilution air introduced into the crankcase, and other factors.

FIG. 8A shows the array 500A with more of the blow-by gas coupling apparatuses 502 than are present with the array 500 of FIG. 8. This can be the result of a lower flow of blow-by gas being required by the engine or relatively more flow of the blow-by gas being utilized by other auxiliary components. FIG. 8B shows the array 500B with less of the blow-by gas coupling apparatuses 502 being utilized as compared with the array 500 of FIG. 8 or the array 500A of FIG. 8A. This can be the result of higher flow of blow-by gas being required by the engine or relatively less (or no) flow of the blow-by gas being utilized by other auxiliary components. Arrays 500, 500A having multiple oil separation devices allows for packaging the oil separation devices together. This can facilitate flexibility with where blow-by enters an individual filter, or filter array; as well as flexibility with where blow-by exits an individual filter, or filter array.

Figure 9:
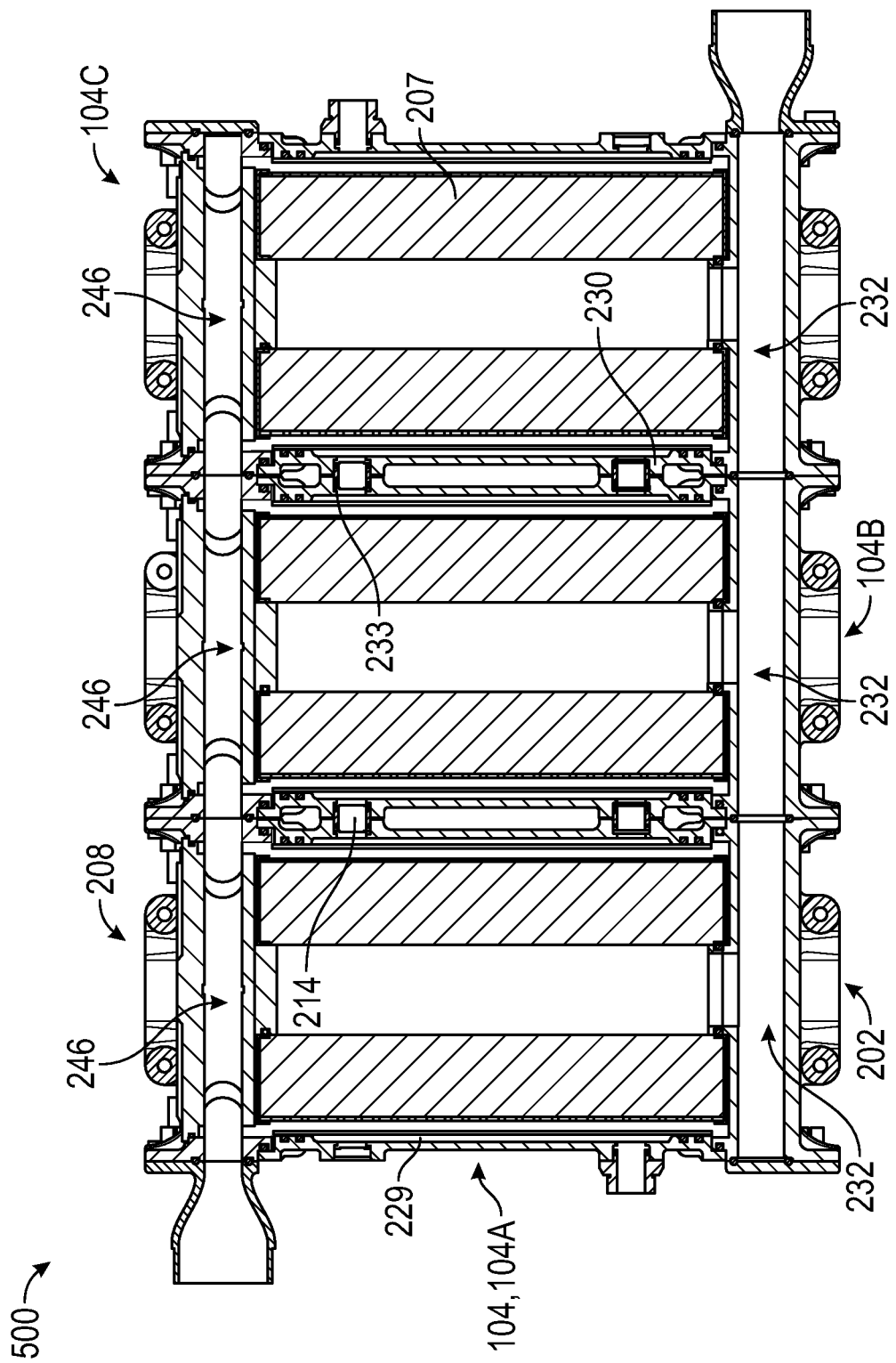
FIG. 9 is a first cross-sectional view of the assembly of the plurality of oil separation devices of FIG. 8.
Figure 10:
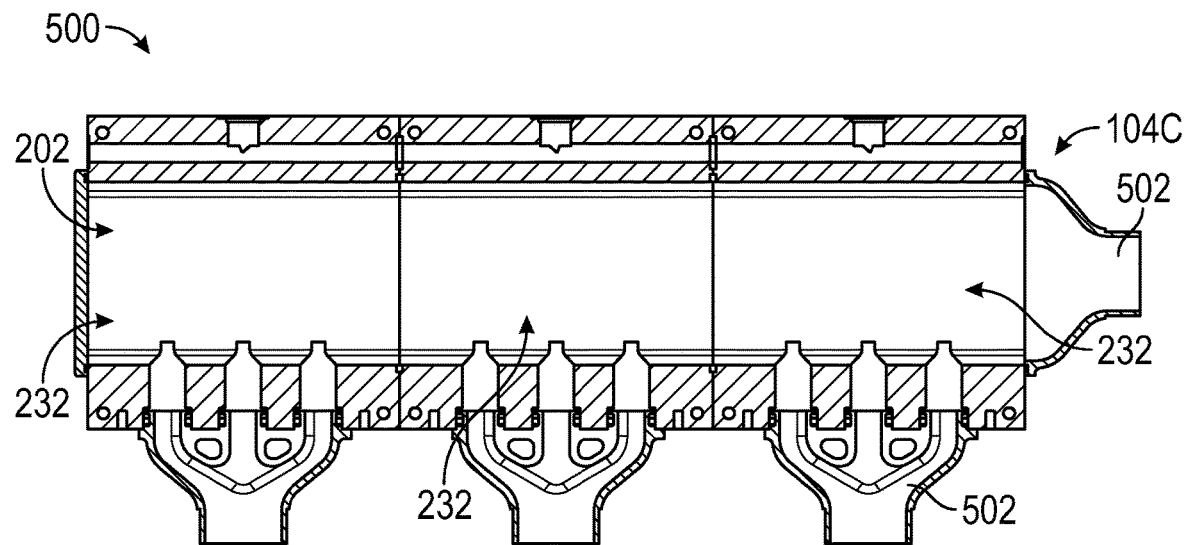
FIG. 10 is a second cross-sectional view through first covers of the assembly of the plurality of oil separation devices of FIG. 8.
Figure 11:
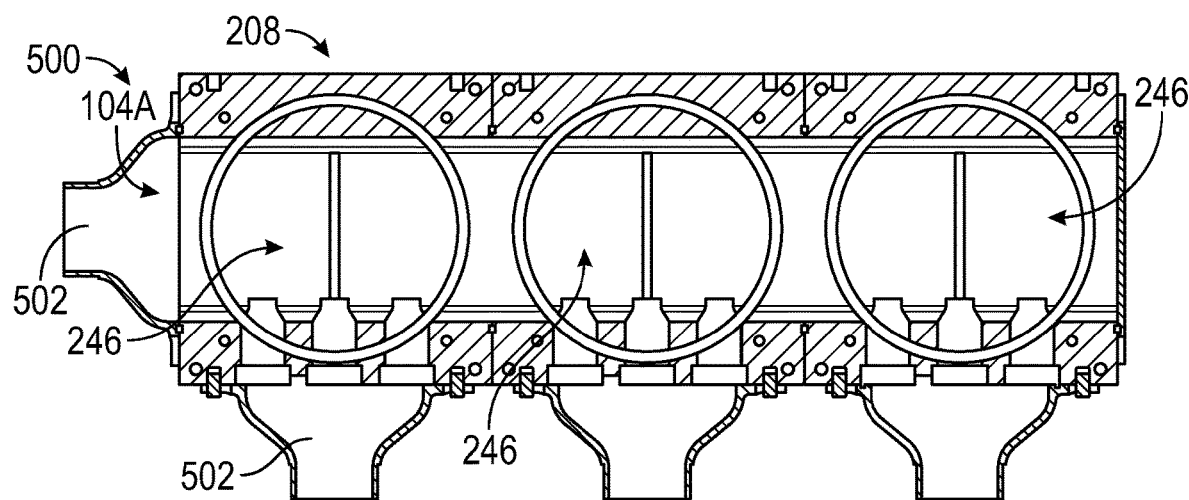
FIG. 11 is a second cross-sectional view through second covers of the assembly of the plurality of oil separation devices of FIG. 8.

FIGS. 9-11 show cross-sectional view of the array 500 of FIG. 8. The individual components of each of the oil separation devices 104A, 104B, 104C have already been described in previous FIGURES, and thus, will not be repeated in great detail.

The cross-section of FIG. 9 illustrates how the first manifold 232 of each first cover 202 can be aligned in fluid communication with one another via ports, passages and other features described previously. The result is the construction of the array 500 has a much larger manifold for receiving blow-by gas, for example. Similarly, the second manifold 246 of each second cover 208 can be combined in fluid communication. Blow-by gas flows can be split passing through the coalescing filters 207.

Figure 13:
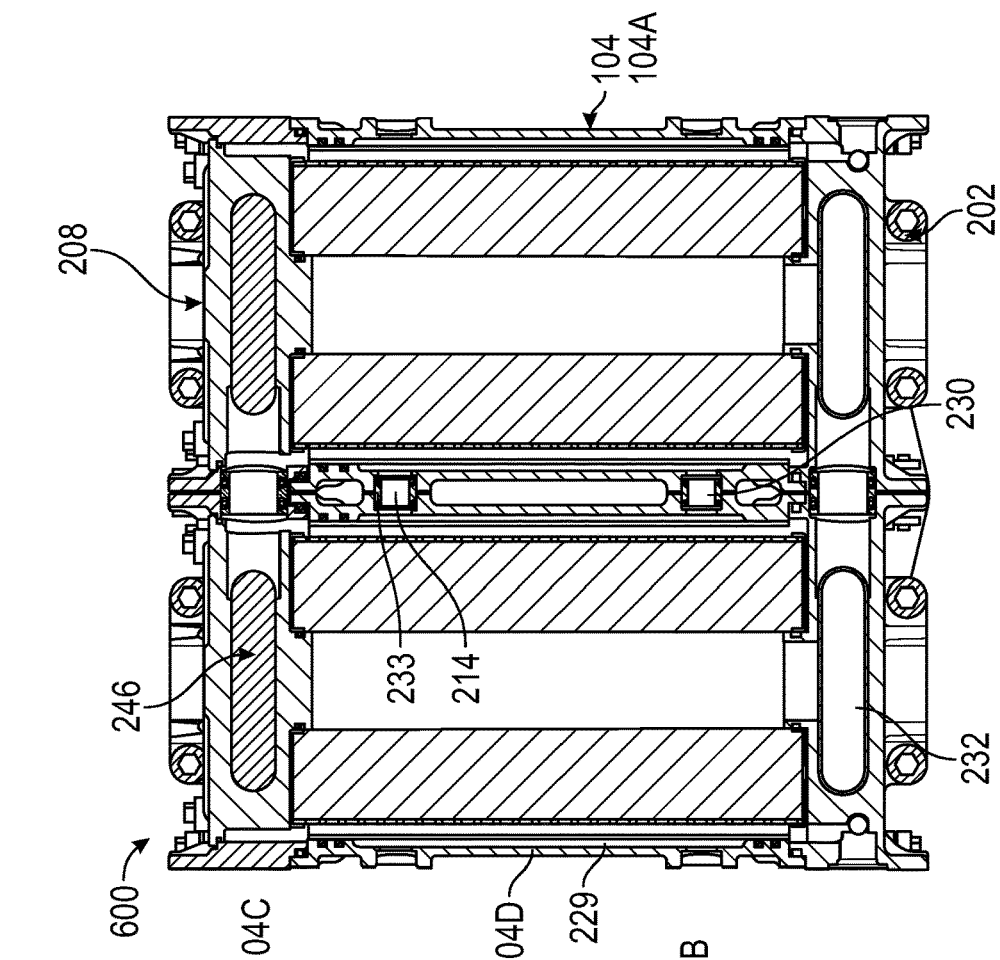
FIGS. 13-13B show further cross-sectional views of the second assembly of FIG. 12.

It should be noted that the flanges 230 (jacket flanges) can be oriented so as to abut or be spaced a small distance from one another. FIG. 13 shows an example where small jumper tubes 233 are utilized. These jumper tubes 233 transfer the fluid from the jacket 229 of the oil separation device 104A to the jacket 229 of the oil separation device 104D. The jumper tubes 233 are trapped within the ports 214 and have O-rings around the OD at each end to seal the interface Features such as pins can be utilized to facilitate such alignment such that respective ones of the ports 214 align with and communicate with one another. Such alignment can facilitate fluid communication between the jacket 229 of each of the oil separation devices 104A, 104B, 104C. Such arrangement allows for fluid such as pressurized engine boost air, engine coolant, or engine lube oil to be passed through the oil separation devices 104A, 104B, 104C (and respective jackets 229) sequentially. Jumper tubes 233 can also be utilized to communicate the pressurized fluid from row-to-row, not just device-to-device within a given row. Plugs can selectively be used in lieu of jumper tubes 233 as desired in communication between one jacket 229 to the next is not desired of if sealing the jacket(s) 229 is desired.

FIG. 10 shows a cross-section of the arrangement of the first covers 202 abutted together (or spaced in close proximity to one another but coupled to one another) to form the larger first manifold 232 as previously discussed with various of the blow-by gas coupling apparatuses 502 coupled to the second faces and the third face of the third oil separation device 104C.

FIG. 11 shows a cross-section of the second covers 208 as previously described. The second covers 208 are abutted (or spaced in close proximity but coupled to one another) and arranged together to form the larger second manifold 246 as previously discussed with various of the blow-by gas coupling apparatuses 502 coupled to the second faces and the first face of the first oil separation device 104A.

Figure 12:
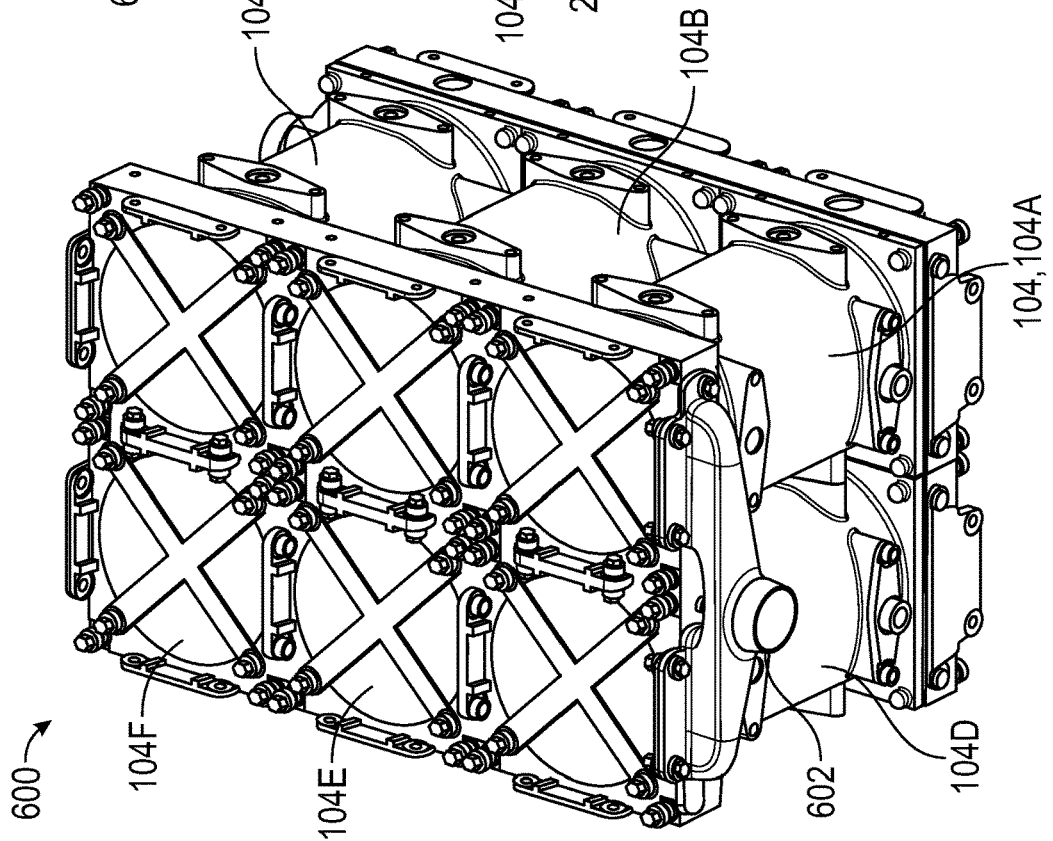
FIG. 12 shows a second assembly of a plurality of oil separation devices arranged in a multi-row array with a first configuration according to one example of the present application.

FIG. 12 shows a double row array 600 of a plurality of the oil separation devices 104 according to a further example. This array has two rows of multiple oil separation devices 104 coupled together. The array 600 can be used in applications having a larger amount of blow-by gas (e.g., from a larger engine) or where blow-by can be used with additional auxiliary components as compared with the arrays 500, 500A and 500B previously discussed. The dual row array 600 can include a first row with the first, second and third oil separation devices 104A, 104B and 104C described previously and a second row with fourth, fifth and sixth oil separation devices 104D, 104E and 104F. The example of FIG. 12 employs only two blow-by gas coupling apparatuses 602. These blow-by gas coupling apparatuses 602 are modified to be larger than those described previously to accommodate multiple flows of blow-by fluid.

FIG. 12 shows an arrangement where selective ports on the some of the faces of the first covers and second covers are blocked with plates. However, these ports maybe utilized for blow-by gas flow according to further embodiments. Thus, the example of FIG. 12 is purely exemplary as to the number of oil separation devices 104 utilized and the number of and construction of the blow-by gas coupling apparatuses 602. Additional rows in an array (more than two) are also contemplated according to further examples.

Figure 13A:
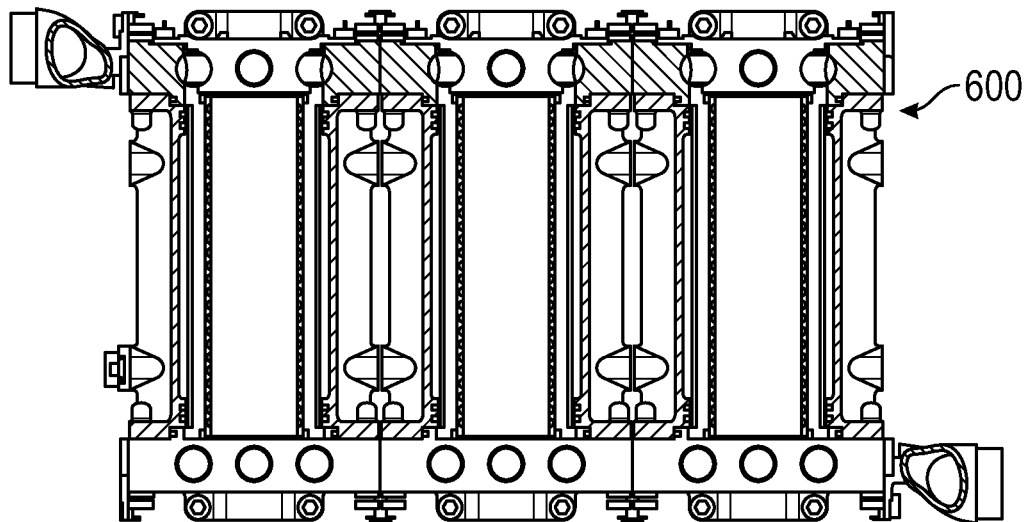
Figure 13B:
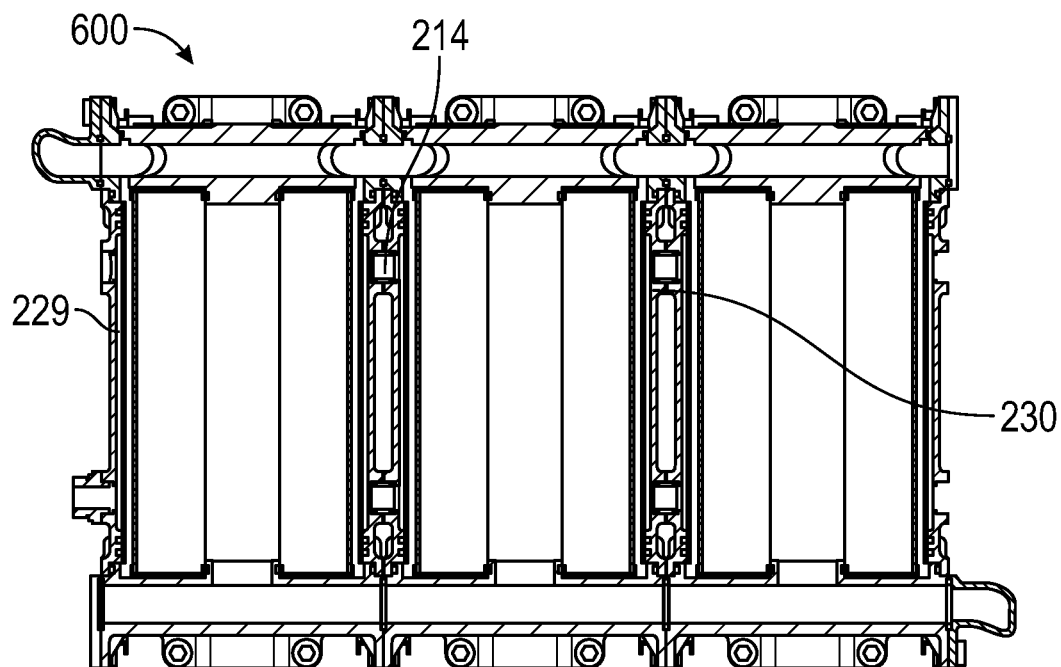

FIGS. 13-13B show various cross-sections of the array 600 of FIG. 12. It should be noted in FIG. 13 that the orientation of the first, second and third oil separation devices 104A, 104B and 104C has been modified from those previously shown. In particular, the first, second and third oil separation devices 104A, 104B and 104C are rotated such that the fourth faces of the first and second covers are now on the viewers right. This allows the second faces of the first, second and third oil separation devices 104A, 104B and 104C with the plurality of ports to abut or be spaced a small distance from one another and be in fluid communication with the plurality of ports and the second faces of the fourth, fifth and sixth oil separation devices 104D, 104E and 104F. Such arrangement allows for an even larger fluid communication between the first manifolds 232 across the respective rows (first and second) as well as between the oil separation devices along a particular row. Thus, the combined size of the first manifold 232 and the second manifold 246 of the second covers 208 can be doubled as compared with the examples of FIGS. 8-11. It is however contemplated that communication between rows (or indeed between particular ones of the oil separation devices 104) could be selectively blocked as desired according to further examples. It should be noted that the blow-by fluid interface between oil separation device rows (104A and 104D in FIG. 13) can accomplished by a larger diameter jumper tube with o-rings at each end, for example.

FIGS. 13 and 13B additionally shows that the flanges 230 (jacket flanges) can be oriented so as to abut or be spaced a small distance from one another as illustrated between the two rows. Respective ones of the ports 214 align with and communicate with one another between the rows (e.g., between the first oil separation device 104A and the fourth oil separation device 104D as shown in FIG. 13). Such alignment can facilitate fluid communication between the jacket 229 of each of the oil separation devices 104A, 104B, 104C, 104D, 104E and 104F. Such arrangement allows for fluid such as pressurized engine boost air, engine coolant, or engine lube oil to be passed through the oil separation devices 104A, 104B, 104C, 104D, 104E and 104F (and respective jackets 229).

Figure 14:
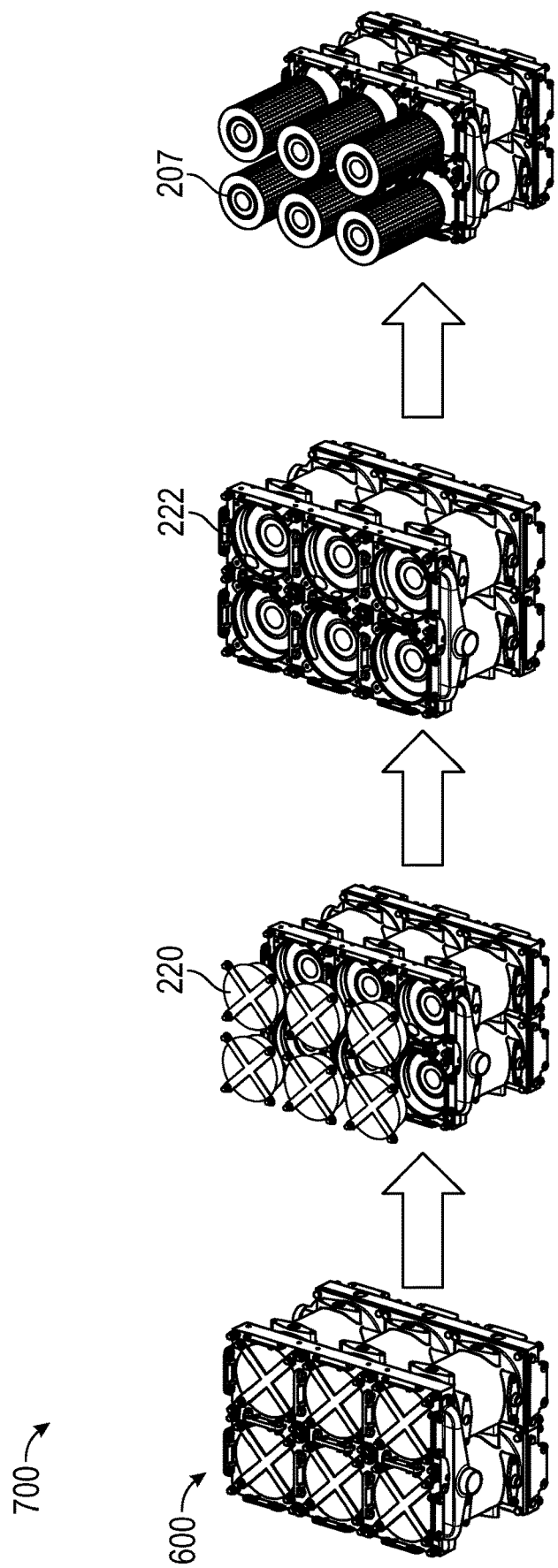
FIG. 14 is a schematic illustration of a process of accessing and removing coalescing filters from the second assembly of the oil separation devices of FIG. 12 according to one example of the present application.

FIG. 14 shows a method 700 whereby each coalescing filter 207 of the array 600 can be removed from a respective one of the oil separation devices 104 to be selectively cleaned or replaced. The method 700 removes the insulative material 118 (not shown) to access the service plug 220. The service plug 220 is then selectively removed from the main body 222. This allows the coalescing filter 207 to be accessed and removed.

Figure 15A:
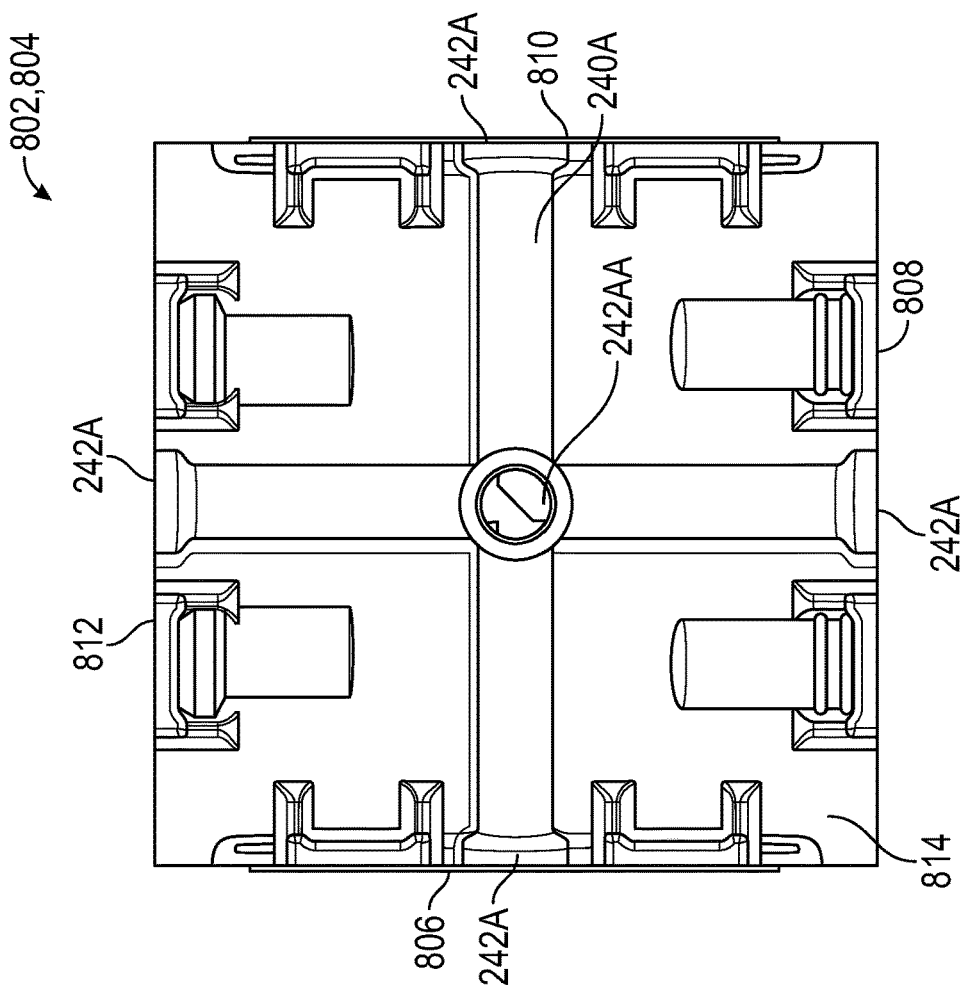
FIG. 15A is a plan view of an end surface of a first cover of the oil separation device of FIG. 15.
Figure 15:
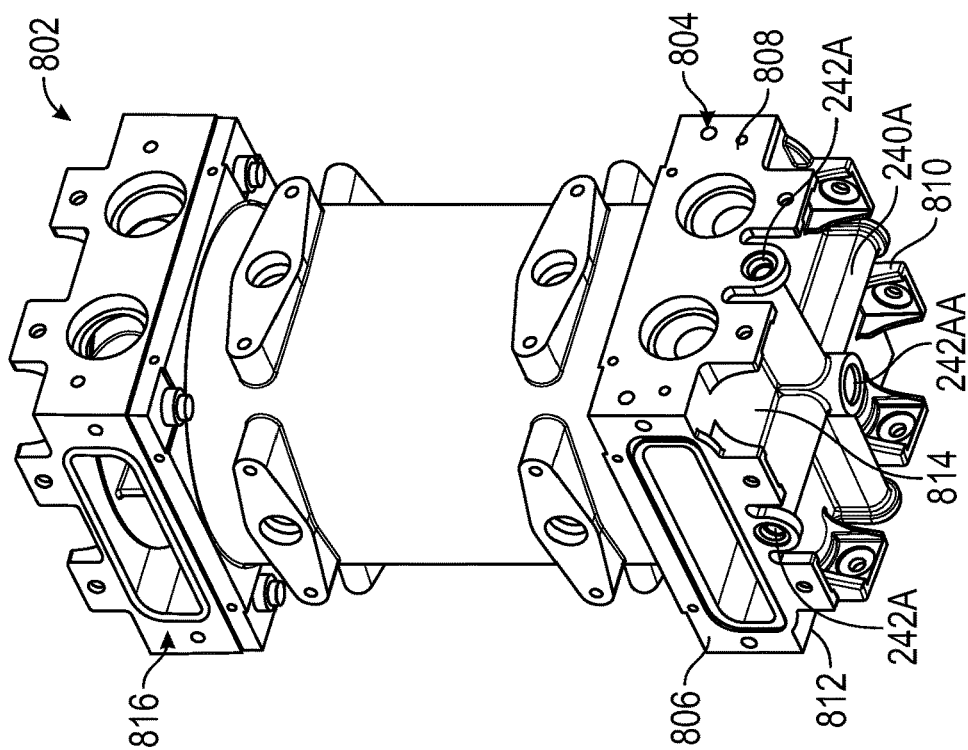
FIG. 15 is a perspective view of the oil separation device according to another example of the present application.

FIGS. 15 and 15A show another example of an oil separation device 802 similar to those described previously. As shown in FIGS. 15 and 15A, the oil separation device 802 differs from those previously described in that additional one or more passages 240A have been formed by the first cover 804 and additional outlet ports 242A for oil drainage have also been provided. The one or more passages 240A can communicate at multiple locations with the outer cavity adjacent the exterior of the filter. Similarly, the one or more passages 240A can extend in multiple directions to a plurality of the faces including a first face 806, a second face 808, a third face 810 and a fourth face 812 of the first cover 804. The one or more ports 242A can also be provided at each of the first face 806, second face 808, third face 810 and the fourth face 812 of the first cover 804. A central port 242AA can also be provided in an end wall 814 of the first cover 804.

Figure 15B:
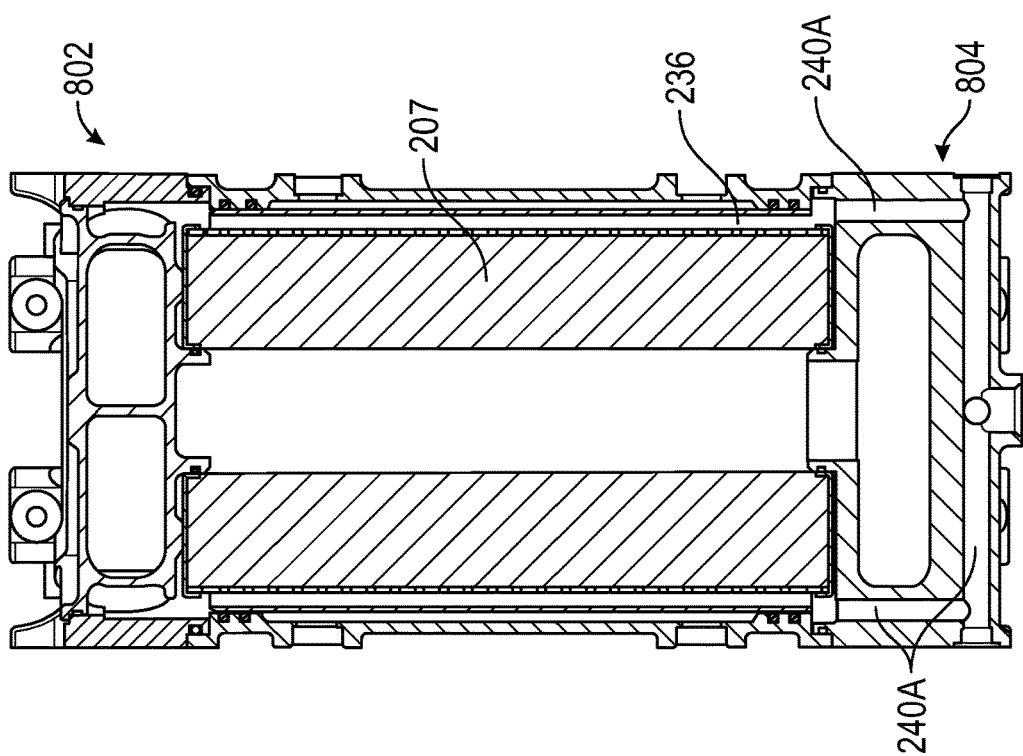
FIG. 15B is a cross-sectional view of the oil separation device of FIG. 15.

FIG. 15B shows a cross-section of the oil separation device 802 showing the one or more passages 240A communicating in a plurality of locations with the outer cavity 236 adjacent the outer surface of the coalescing filter 207.

It should be noted in the example of FIGS. 15-15B that the first cover 804 differs from the prior first covers described herein in prior FIGURES in that the first cover 804 is now formed to be symmetric with respect to the construction of the one or more passages 240A (each extending to a respective one of the first face 806, second face 808, third face 810 and the fourth face 812 of the first cover 804). Furthermore, the first cover 804 is bi-symmetric in construction of the faces 806, 808, 810, and 812. More particularly, the first face 806 and the third face 810 can share a same geometry with respect to the one or more ports and additionally the second face 808 and the fourth face 812 can share a same geometry with respect to the one or more ports. This construction differs from prior first cover constructions where the fourth face had a different geometry than the second face. The second cover 816 (FIGS. 15 and 15B) can have a similar port construction and symmetry as the first cover 804 with regard to the faces. The symmetry of the oil separation devices 802 allows for three or more rows for an array to be created.

Figure 16:
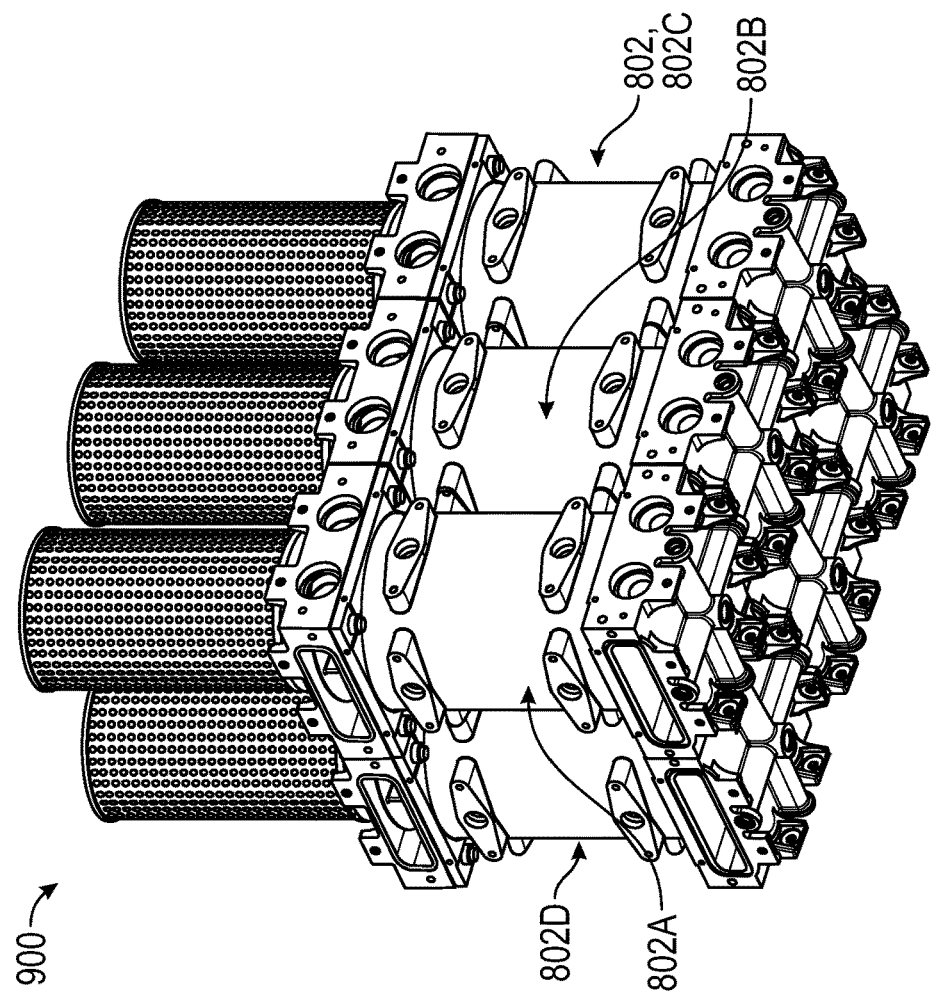
FIG. 16 is a perspective view of a third assembly of a plurality of oil separation devices of FIG. 15 arranged in a multi-row array according to one example of the present application.

FIG. 16 shows a double row array 900 of a plurality of the oil separation devices 802 according to a further example. This array 900 has two rows of multiple oil separation devices 802 coupled together. The array 900 can be used in applications having a larger amount of blow-by gas (e.g., from a larger engine) or where blow-by can be used with additional auxiliary components as compared with the arrays 500, 500A and 500B previously discussed. The dual row array 900 can include a first row with the first, second and third oil separation devices 802A, 802B and 802C described previously and a second row with fourth, fifth and sixth oil separation devices (only the fourth separation device 802D is shown in FIG. 16).

FIG. 16A shows a cross-section of the first covers 804 of the array 900 of the oil separation devices 802 showing the combined first manifold 232 with potential entry ports 902 for blow-by gas shown with arrows indicating potential blow-by gas flow into the first manifold 232 through the ports 902. Fluid communication between the first manifolds 232 can also be achieved by ports 902A.

Figure 16B:
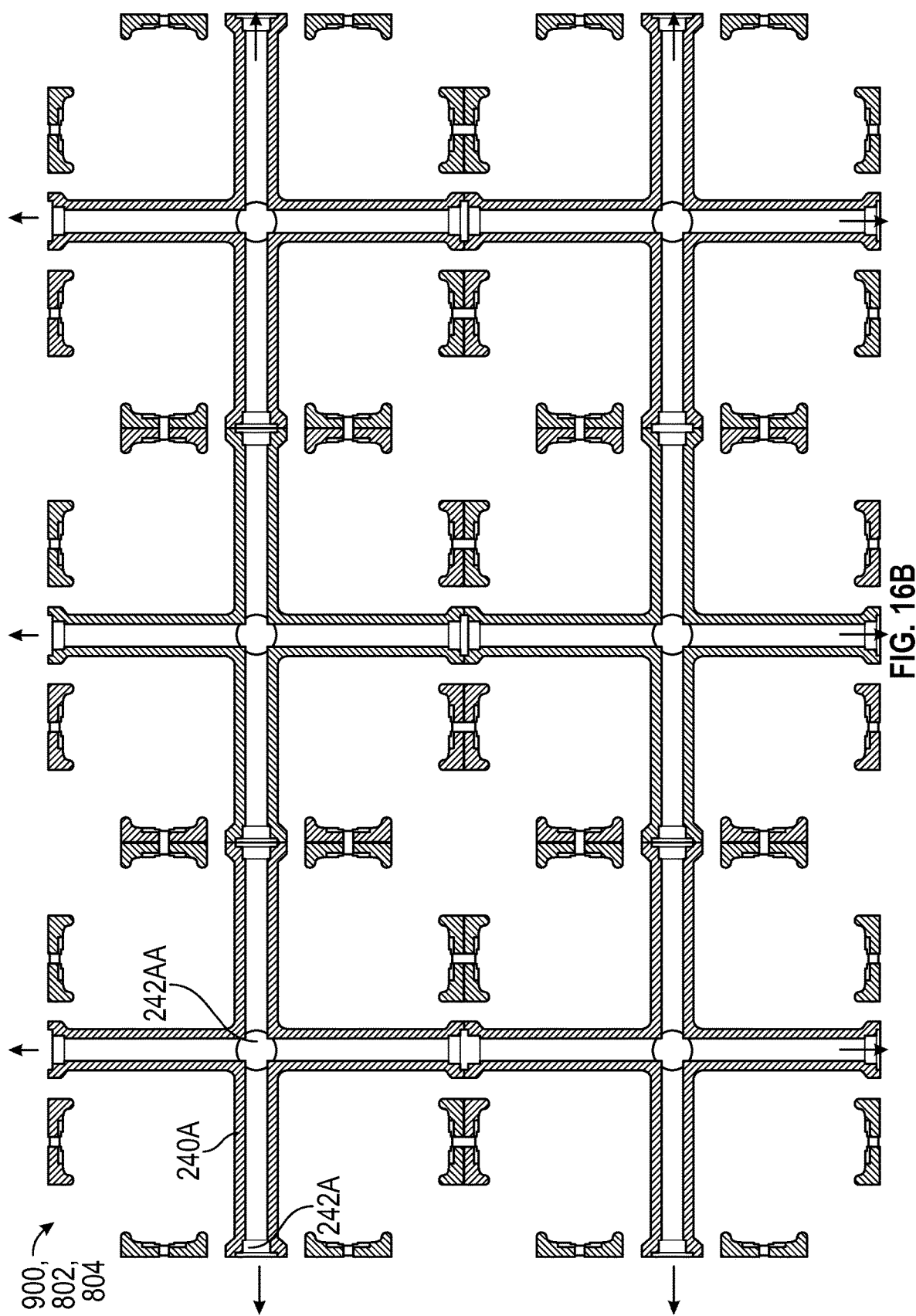
FIG. 16B is a second cross-sectional view of oil passages of the first covers of the assembly of the plurality of oil separation devices of FIG. 16.

FIG. 16B shows a cross-section of the first covers 804 of the array 900 of the oil separation devices 802 showing the combined one or more passages 240A of the array 900. The potential drainage flow of oil through the ports 242A is also shown. Central ports 242AA can also provide for drainage of oil if desired.

FIG. 16C shows a cross-section through second covers 816 of the array 900 of the oil separation devices 802 showing the combined second manifold 246 with potential exit ports 904 for blow-by gas after filtering shown with arrows. Fluid communication between the second manifolds 246 can also be achieved by ports 904A.

Figure 17:
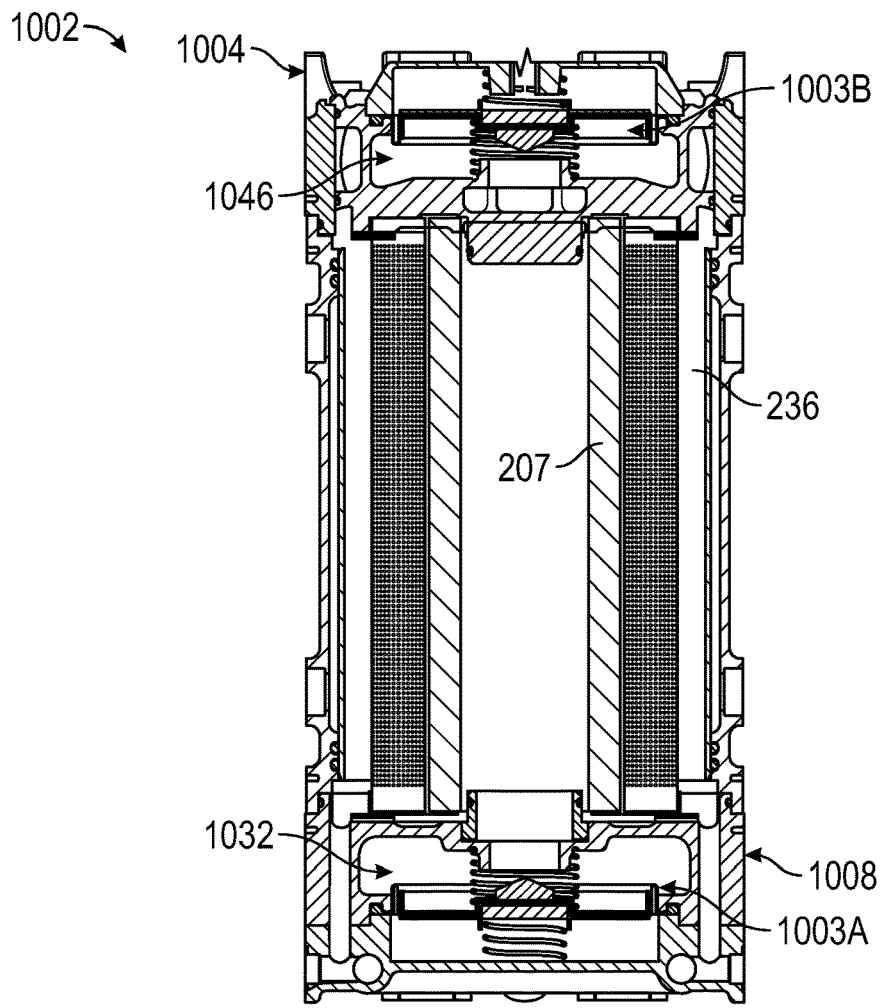
FIG. 17 is a cross-sectional view of another oil separation device according to one example of the present application.

FIG. 17 shows a cross-sectional view of an example of an oil separation device 1002 similar to those described and shown previously herein. The oil separation device of FIG. 17 has been modified to include internal pressure regulators 1003A and 1003B. The oil separation device 1002 with the internal pressure regulators 1003A and 1003B with any of the systems or arrays discussed previously. Each of the oil separation devices of the arrays can include the pressure regulators 1003A and 1003B.

A first of the pressure regulators 1003A can be positioned within a first manifold 1032 of a first cover 1004. A second of the pressure regulators 1003B can be positioned within a second manifold 1046 of a second cover 1008. Thus, the first pressure regulator 1003A can be configured to regulate a pressure of the blow-by gas to the coalescing filter 207 (as well as crankcase pressure). The second pressure regulator 1003B can be configured to regulate the pressure of the blow-by gas after passing through the coalescing filter 207 from the outer cavity 236 adjacent the outer surface of the coalescing filter 207 to and from the second manifold 1046.

Figure 17A:
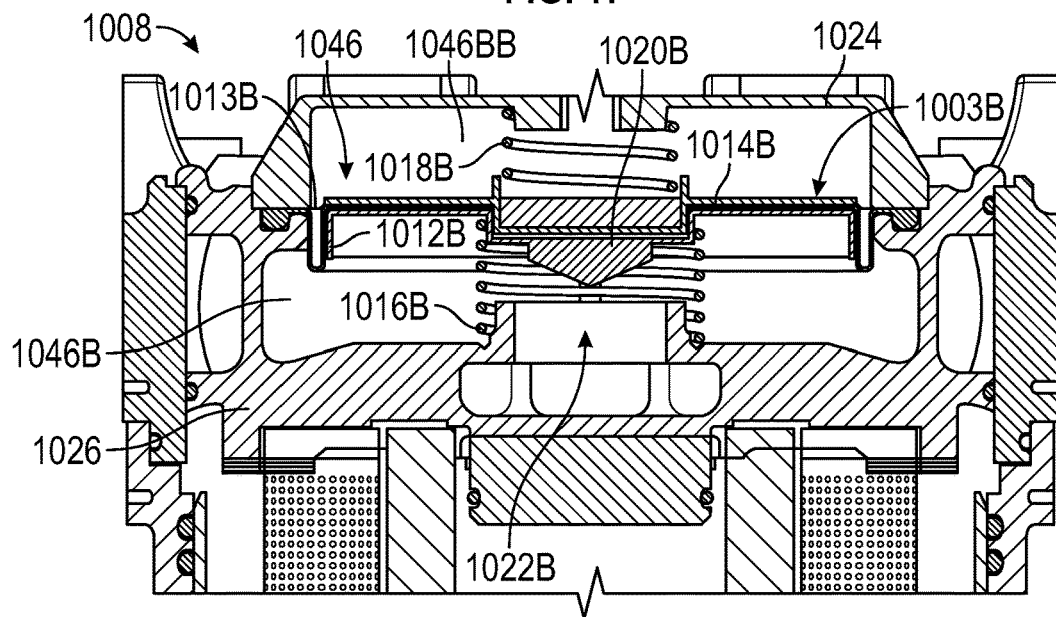
FIG. 17A is an enlarged cross-sectional view of a second cover of the oil separation device of FIG. 17 showing a second pressure regulator assembly positioned within the second cover according to one example of the present application.
Figure 17B:
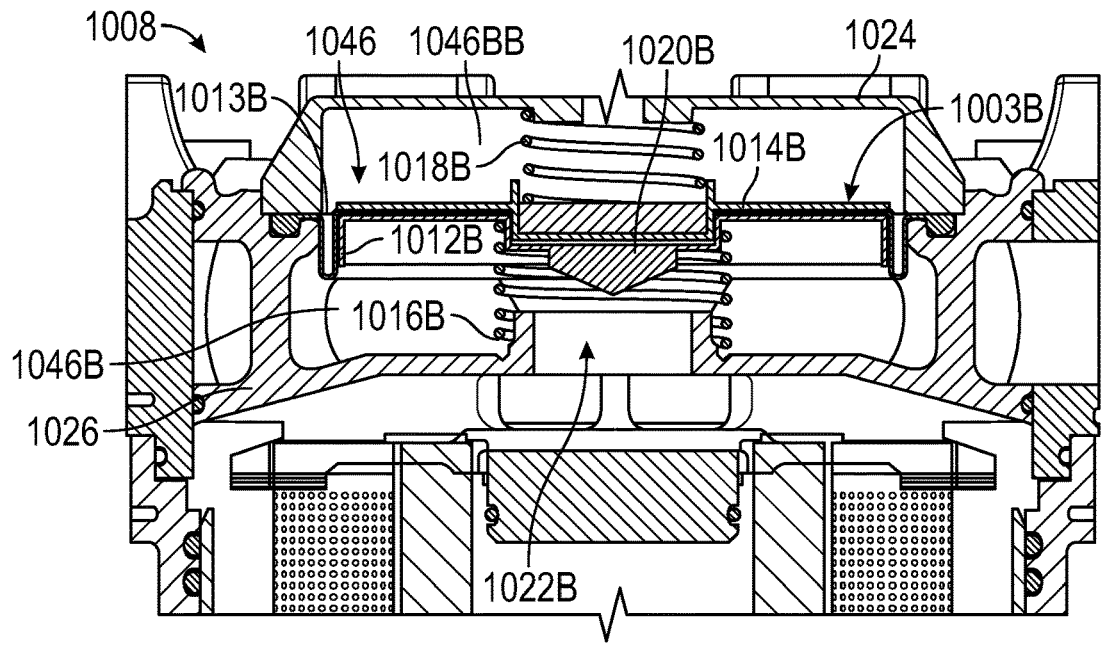
FIG. 17B is cross-sectional view of the second cover along an axis perpendicular to the cross-sectional view of FIG. 17A.

FIGS. 17A and 17B are an enlarged cross-sectional views of the pressure regulator 1003B within the second manifold 1046 of the second cover 1008. The pressure regulator 1003B can define a first side 1046B of the second manifold 1046. The first side 1046B can be in communication with a pressure source, for example. This pressure source can be a vacuum or lower pressure source such as the jet pump or an inlet to a turbocharger (see FIG. 1). The second cover 1008 can include second side 1046BB of the second manifold 1046 separated from the first side 1046B of the second manifold 1046 by the pressure regulator 1003B. The pressure regulator 1003B is configured to create a pressure tight seal between the first side 1046B and the second side 1046BB. The second side 1046BB of the second manifold 1046 can be in communication with ambient or a relatively higher pressure source than the first side 1046B. Based upon pressure differential and spring forces (and optionally other criteria), the pressure regulator 1003B can regulate pressure within the manifold 1046 to allow for a desired pressure of the blow-by gas to and from the second manifold 1046.

The second pressure regulator 1003B can include a first body piece 1012B, a diaphragm 1013B, a second body piece 1014B, a first spring 1016B and a second spring 1018B. The second body piece 1014B can include a member 1020B. The first body piece 1012B and the second body piece 1014B can capture the diaphragm 1013B therebetween.

The first body piece 1012B and the second body piece 1014B can be formed of a plastic or other rigid material that can be engaged by the first spring 1016B and the second spring 1018B, respectively. The first body piece 1012B or part of the diaphragm 1013B can be captured at an outer diameter between separate pieces of the second cover 1008 so as to form a seal between the first side 1046B and the second side 1046BB. A first side of the first spring 1016B can engage a lower piece 1026 of the second cover 1008 and can be positioned around or adjacent an inlet port 1022B for the blow-by gas to the first side 1046B of the second manifold 1046. A second side of the first spring 1016B that opposes the first side can engage with the first body piece 1012B. The first spring 1016B can exert a spring force on the first body piece 1012B.

The second body piece 1014B can be positioned atop the diaphragm 1013B. The second body piece 1014B can be engaged by a first side of the second spring 1018B. A second side of the second spring 1018B can engage a top piece 1024 of the second cover 1008. The second spring 1018B can exert a spring force on the second body piece 1014B in a direction generally opposed to the spring force exerted by the first spring 1016B on the first body piece 1012B.

The diaphragm 1013B is configured for rolling or other movement within the second manifold 1046 by elastic deformation. A direction of such movement can be dictated by difference in the pressure between the first side 1046B of the second manifold 1046 and the second side 1046BB of the second manifold 1046 as well as differences in spring force exerted by the first spring 1016B and the second spring 1018B on the first body piece 1012B and the second body piece 1014B, for example. The member 1020B can be shaped relative to the inlet port 1022B to provide for a restriction of flow of the blow-by gas into the first side 1046B of the second manifold 1046. Thus, the member 1020B can comprise a projection or other feature configured to interact with the inlet port 1022B.

Figure 17C:
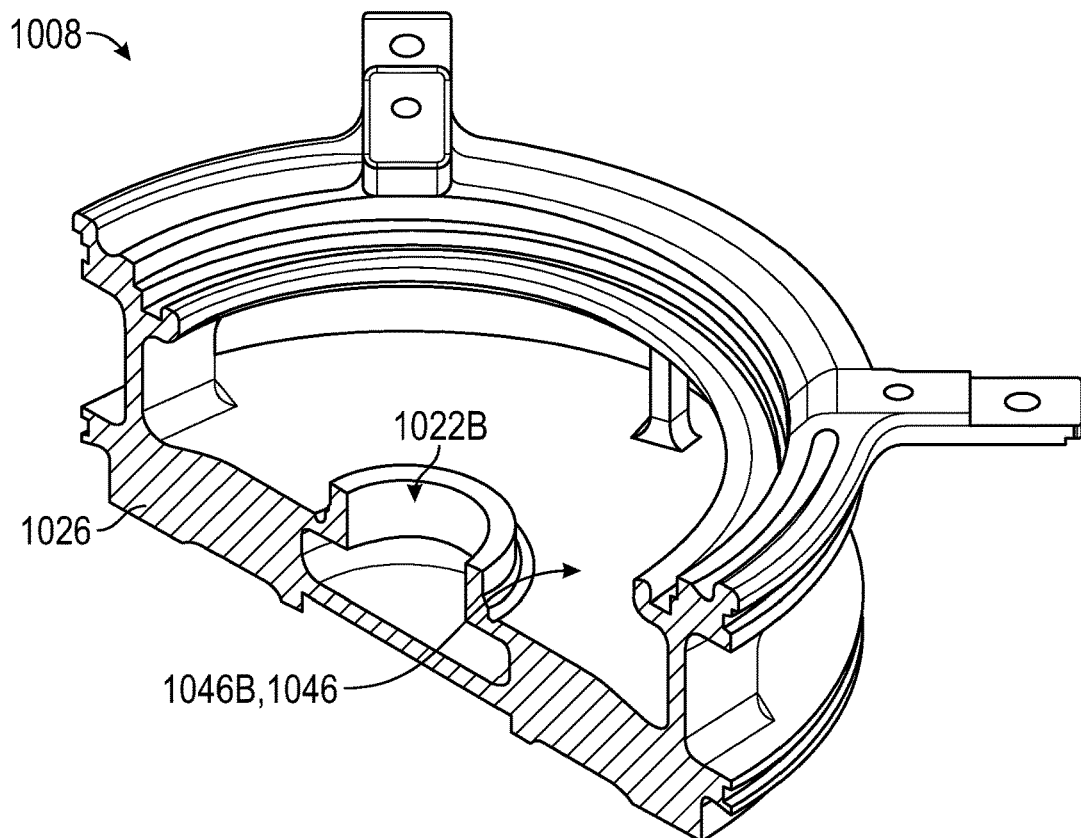
FIG. 17C is a perspective view of a portion of the second cover of FIGS. 17-17B.

FIG. 17C is a cross-sectional view of the lower piece 1026 of the second cover 1008 with the second pressure regulator 1003B and top piece 1024 removed. FIG. 17C illustrates parts the first side 1046B of the second manifold 1046 and the inlet port 1022B.

Figure 18:
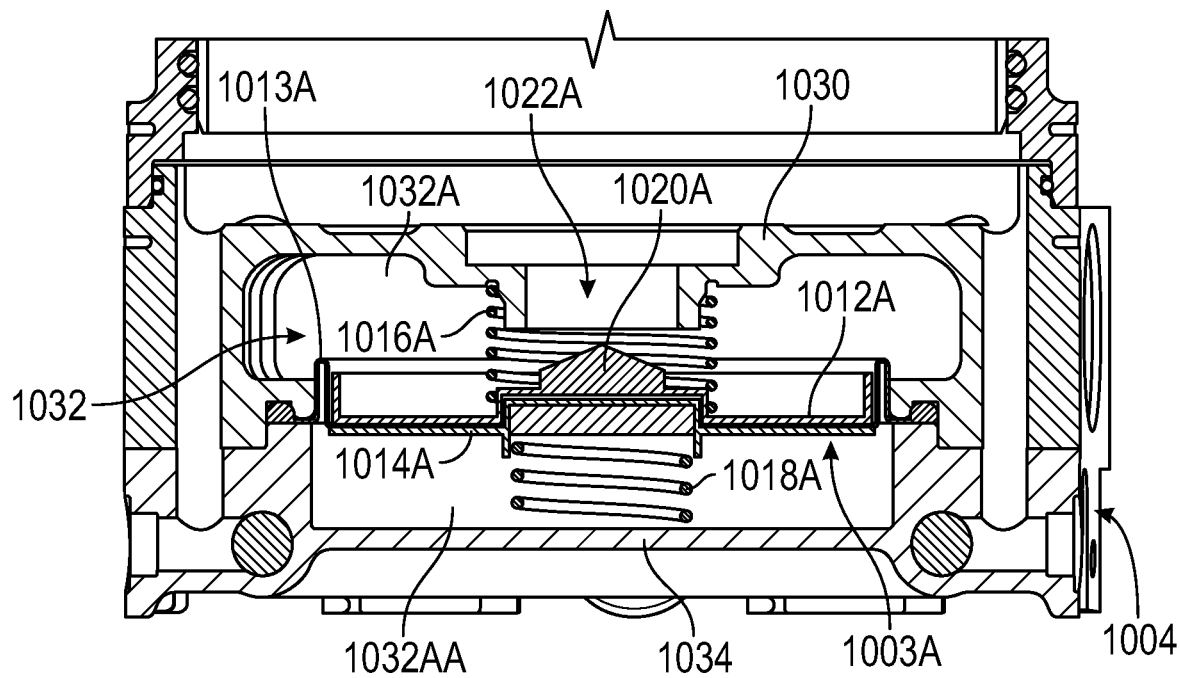
FIG. 18 is an enlarged cross-sectional view of a first cover of the oil separation device of FIG. 17 showing a first pressure regulator assembly positioned within the first cover according to one example of the present application.

FIG. 18 is an enlarged cross-sectional view of the first pressure regulator 1003A positioned within the first manifold 1032 of the first cover 1004. The first pressure regulator 1003A can regulate pressure within the first manifold 1032 so that a pressure within the crankcase 101 (FIG. 1) is kept within a desired pressure range.

The first pressure regulator 1003A can be positioned within the first cover 1004 and can divide the first manifold 1032 into a first side 1032A and a second side 1032AA. The second side 1032AA of the first manifold 1032 is separated from the first side 1032A of the first manifold 1032 by the pressure regulator 1003A. The first pressure regulator 1003A is configured to create a pressure tight seal between the first side 1032A and the second side 1032AA. The second side 1032AA of the first manifold 1032 can be in communication with ambient or another pressure source. Based upon pressure differential and spring forces (and optionally other criteria), the pressure regulator 1003A can regulate pressure within the first manifold 1032 to allow for a desired pressure for the crankcase.

The first pressure regulator 1003A can include a first body piece 1012A, a diaphragm 1013A, a second body piece 1014A, a first spring 1016A and a second spring 1018A. The second body piece 1014A can include a member 1020A. The first body piece 1012A and the second body piece 1014A can capture the diaphragm 1013A therebetween.

The first body piece 1012A and the second body piece 1014A can be formed of a plastic or other rigid material that can be engaged by the first spring 1016A and the second spring 1018A, respectively. The first body piece 1012A or part of the diaphragm 1013A can be captured at an outer diameter between separate pieces of the first cover 1004 so as to form a seal between the first side 1032A and the second side 1032AA. A first side of the first spring 1016A can engage an upper piece 1030 of the first cover 1004 and can be positioned around or adjacent an outlet port 1022A for the blow-by gas to the first side 1032A of the first manifold 1032. A second side of the first spring 1016A that opposes the first side can engage with the first body piece 1012A. The first spring 1016A can exert a spring force on the first body piece 1012A.

The second body piece 1014A can be positioned atop the diaphragm 1013A. The second body piece 1014A can be engaged by a first side of the second spring 1018A. A second side of the second spring 1018A can engage a bottom piece 1034 of the first cover 1004. The second spring 1018A can exert a spring force on the second body piece 1014A in a direction generally opposed to the spring force exerted by the first spring 1016A on the first body piece 1012A.

The diaphragm 1013A is configured for rolling or other movement within the first manifold 1032 by elastic deformation. A direction of such movement can be dictated by difference in the pressure between the first side 1032A of the first manifold 1032 and the second side 1032AA of the first manifold 1032 as well as differences in spring force exerted by the first spring 1016A and the second spring 1018A on the first body piece 1012A and the second body piece 1014A, for example. The member 1020A can be shaped relative to the outlet port 1022A to provide for a restriction of flow of the blow-by gas from the first side 1032A of the first manifold 1032. Thus, the member 1020A can comprise a projection or other feature configured to interact with the outlet port 1022A.

Figure 19:
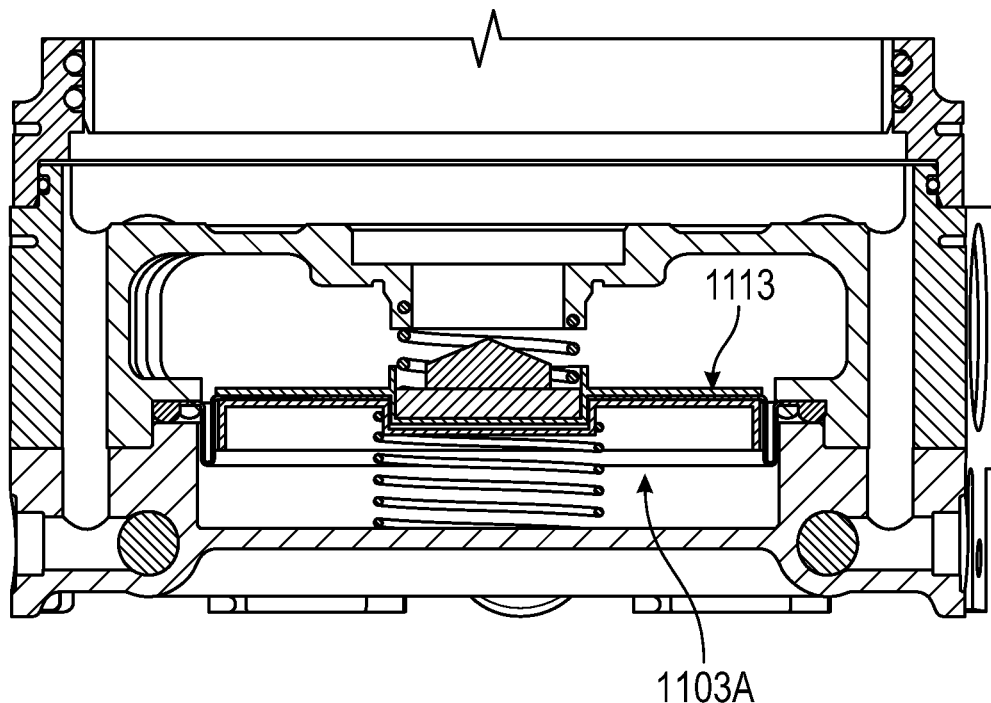
FIG. 19 is an enlarged cross-sectional view of an alternative example of the first cover with an alternative configuration for the first pressure regulator assembly.

FIG. 19 shows an alternative design for a first pressure regulator 1103A. The first pressure regulator 1103A has an orientation of a diaphragm 1113 reversed as compared with the example of FIG. 18.

INDUSTRIAL APPLICABILITY

In operation, the engine 100 can be configured to combust fuel to generate power. While typically efficient, a small portion of the combustion gases may escape the combustion chamber past the piston as blow-by and enter undesirable areas of the engine 100 such as the crankcase. The present disclosure contemplates a system 102 including one or more oil separation devices 104 to filter oil to remove the oil from the blow-by gas.

Oil separation devices containing coalescing filters are known, however, these have disadvantages. These devices typically lack cold climate capability, they lack robustness to high heat environments, and/or they lack vibration robustness. The present application recognizes a construction for the oil separation devices 104 that utilizes the jacket 229 to cool, insulate, and/or warm the filter of the oil separation devices 104 to a desired temperature range. This improves operation of the filter in cold climate or high heat environments. The design of the oil separation devices 104 can have temperature and vibration robustness. Thus, the present oil separation devices 104 can be configured to reduce or prevent heat loss, water condensate, oil/water emulsion, and/or freezing. The oil separation devices 104 with the jacket 229 and insulation materials discussed can be configured to protect temperature sensitive filtration components from over-temperature. The oil separation devices 104 can have a long hour durability even under high vibration loading due to the durable casting and mechanical coupling of the components discussed.

Additionally, oil separation devices known in the art are often purpose-built solutions. As such, these devices do not offer the configurability, commonality, scalability and modularity needed to address a wide range of multi-displacement and different power density engine platforms. The present oil separation devices 104 can be configurable as assemblies such as arrays 500, 500A, 500B, 600 and/or 900. This modularity (the desired number of oil separation devices can be easily selected and implemented together as an array) can provide for the configurability, commonality, scalability and modularity needed to address various engine platforms. The assemblies described can be easily constructed to handle various volumes of blow-by gas and other fluids as desired for various engine and/or auxiliary component needs.

Thus, the present oil separation devices and systems and methods of use can maintain common inlet and/or outlet covers and manifolds with a wide variety of coalescing filter lengths (the central housing between the inlet and outlet covers can be removed and replaced with different length as desired). Additionally, the configuration of the inlet and/or outlet covers having ports/passages on each of four faces (or even three of four faces) allows for various system configurations (multi-row parallel arrays, multi-row series arrays, U-shaped arrays, L-shape arrays, T-shaped arrays, H-shaped arrays, single row arrays, etc.). Similarly, oil drain manifolding on each of four faces (or indeed even on three or two of four faces) of the inlet or outlet covers can allow for collection and draining of oil in directions as desired. Similarly, draining from a bottom of the inlet or outlet cover is also disclosed. The outer housing 204 can also include ports that can be used to communicate with the jacket 229 as discussed herein. These ports can be located along multiple sides/faces (e.g., corresponding to the four faces of the inlet and/or outlet covers, for example). This can allow for supplemental energy fluid to be supplied between the oil separation devices in various directions as desired. The configuration of the inlet and/or outlet covers having ports/passages on each of four faces (or even three of four faces) minimizes or eliminates the need for piping, lines or other communication mechanisms between the oil separation devices of the system. Put another way, the configuration of the oil separation devices allows for them to be placed in close proximity (e.g., abutting or spaced a small distance) communicating with one another as desired and allows for blow-by, oil drain, supplemental energy to the jacket to be communicated between the oil separation devices as desired.

The above detailed description is intended to be illustrative, and not restrictive. The scope of the disclosure should, therefore, be determined with references to the appended claims, along with the full scope of equivalents to which such claims are entitled.

What is claimed is:

1. An assembly for separating oil from a blow-by gas of an engine comprising:
   a first oil separating apparatus comprising:
   an outer housing;
   a first filter configured to separate the oil from the blow-by gas positioned within the outer housing;
   a first cover connected to at least the outer housing at a first end portion thereof, wherein the first cover is in fluid communication with the first filter via a first manifold defined by the first cover, and wherein the first cover has a first plurality of ports that communicate with the first manifold; and
   a second cover connected to at least the outer housing at a second end portion thereof, wherein the second cover is in fluid communication with the first filter via a second manifold defined by the second cover, and wherein the second cover has a second plurality of ports that communicate with the second manifold;
   a second oil separating apparatus comprising:
   a second outer housing,
   a second filter configured to separate the oil from the blow-by gas positioned within the outer housing;
   a third cover connected to at least the second outer housing at a first end portion thereof, wherein the third cover is in fluid communication with the second filter via a third manifold defined by the third cover, and wherein the third cover has a third plurality of ports that communicate with the third manifold, wherein at least one of the third plurality of ports of the third cover are in fluid communication with at least one of the first plurality of ports of the first cover such that the third manifold is in fluid communication with the first manifold; and a fourth cover connected to at least the second outer housing at a second end portion thereof, wherein the fourth cover is in fluid communication with the second filter via a fourth manifold defined by the fourth cover, and wherein the fourth cover has a fourth plurality of ports that communicate with the fourth manifold, wherein at least one of the fourth plurality of ports of the fourth cover are in fluid communication with at least one of the second plurality of ports of the second cover such that the fourth manifold is in fluid communication with the second manifold.

2. The assembly of claim 1, wherein at least one of the first plurality of ports of the first cover or at least one of the third plurality of ports of the third cover comprises an inlet to receive the blow-by gas into the assembly.

3. The assembly of claim 2, wherein at least one of the second plurality of ports of the second cover or at least one of the fourth plurality of ports of the fourth cover comprises an outlet for the blow-by gas from the assembly.

4. The assembly of claim 3, wherein the first oil separating apparatus is coupled to the second oil separating apparatus by a first connection interface between the at least one of the first plurality of ports of the first cover and the at least one of the third plurality of ports of the third cover and a second connection interface between the at least one of the second plurality of ports of the second cover and the at least one of the fourth plurality of ports of the fourth cover.

5. The assembly of claim 4, wherein the first oil separating apparatus and the second oil separating apparatus are arranged in one of series or parallel as part of one of a single row array or a double row array of a plurality of oil separating apparatuses.

6. The assembly of claim 1, wherein the first oil separating apparatus includes:
an inner housing positioned within the outer housing, wherein the inner housing defines an inner cavity in which the first filter is positioned, and wherein the inner housing and the outer housing form a first jacket therebetween; and
wherein the outer housing includes at least one of: one or more inlets in fluid communication with the first jacket or one or more outlets in fluid communication with the first jacket.

7. The assembly of claim 6, wherein the second oil separating apparatus includes:
a second inner housing positioned within the second outer housing, wherein the second inner housing defines a second inner cavity in which the second filter is positioned, and wherein the second inner housing and the second outer housing form a second jacket therebetween;
wherein the second outer housing includes at least one of: one or more second inlets in fluid communication with the second jacket or one or more second outlets in fluid communication with the second jacket; and
wherein the second outer housing includes at least one of: one or more second inlets in fluid communication with one or more first outlets of the first oil separating apparatus or one or more second outlets in fluid communication with one or more first inlets of the first oil separating apparatus.

8. The assembly of claim 7, wherein the first jacket is in fluid communication with the second jacket and the first jacket and the second jacket receive one or more of ambient air, boost air, water, or a lube oil.

9. The assembly of claim 1, wherein the first cover has an oil drainage passageway therein and the third cover has an oil drainage passageway therein and wherein the oil drainage passageway of the first cover is in fluid communication with the oil drainage passageway of the third cover such that oil captured by the first filter and the second filter passes out of the assembly at one or more outlet ports in at least one of the first cover or the third cover.

10. The assembly of claim 1, wherein the first oil separating apparatus and the second oil separating apparatus are substantially identically shaped and sized, and wherein a first joint face of the first oil separating apparatus abuts and is coupled to a substantially identically shaped second joint face of the second oil separating apparatus.

11. A method of separating oil from a blow-by gas of an engine, the method comprising:
passing the blow-by gas to a first oil separating apparatus and a second oil separating apparatus, wherein the first oil separating apparatus and the second oil separating apparatus are physically coupled together along interfacing surfaces and in fluid communication with one another as an array;
separating the blow-by gas by passing the blow-by gas through respective filters of the first oil separating apparatus and the second oil separating apparatus;
removing the oil from the blow-by gas with the respective filters;
recombining the blow-by gas after passing from the respective filters; and
passing the blow-by gas as a single flow stream from the first oil separating apparatus and the second oil separating apparatus;
wherein passing the blow-by gas to the first oil separating apparatus and the second oil separating apparatus passes the blow-by gas through a first manifold of a first cover of the first oil separating apparatus to a third manifold of a third cover of the second oil separating apparatus, and wherein the first cover and the third cover are coupled to respective first ends of the first oil separating apparatus and the second oil separating apparatus;
and wherein recombining the blow-by gas after passing from the respective filters passes the blow-by gas through a second manifold of a second cover of the first oil separating apparatus to a fourth manifold of a fourth cover of the second oil separating apparatus, wherein the second cover and the fourth cover are coupled to respective second ends of the first oil separating apparatus and the second oil separating apparatus, and wherein the respective second ends oppose the respective first ends of the first oil separating apparatus and the second oil separating apparatus.

12. The method of claim 11, further comprising:
passing the oil separated by the respective filters as a separate flow from the blow-by gas through respective passageways of the first oil separating apparatus and the second oil separating apparatus, wherein the respective passageways are in fluid communication with one another; and
passing the oil to at least one drainage port of at least one of the first oil separating apparatus or the second oil separating apparatus.

13. The method of claim 11, further comprising heating or cooling the respective filters of the first oil separating apparatus and the second oil separating apparatus.

14. The method of claim 13, wherein heating or cooling the respective filters includes passing a fluid through a first jacket of the first oil separating apparatus to a second jacket of the second oil separating apparatus.

15. An engine system comprising:
 an engine;
 an array of oil separating apparatuses, wherein the array of the oil separating apparatuses includes an assembly of at least a first oil separating apparatus and a second oil separating apparatus that are physically coupled together along interfacing surfaces and in fluid communication with one another;
 a first one or more fluid lines configured to pass a blow-by gas from the engine to the array of the oil separating apparatuses, wherein oil is separated from the blow-by gas by passing through respective filters of the least the first oil separating apparatus and the second oil separating apparatus, wherein the array of the oil separating apparatuses includes an inner housing and an outer housing forming a jacket therebetween, wherein the inner housing is configured to hold one of the respective filters, and wherein each jacket is in fluid communication with one another and is configured to receive one or more of ambient air, boost air, water, or a lube oil;
 a second one or more fluid lines configured to pass passing the blow-by gas from the array of the oil separating apparatuses back to the engine; and,
 wherein each oil separating apparatus comprises an inlet manifold and an outlet manifold separated by the outer housing.

16. The system of claim 15, wherein the blow-by gas is recombined as a single flow upon leaving the respective filters within the oil separating apparatuses, and wherein the second one or more fluid lines comprise a single fluid line that couples to single outlet port of the array of the oil separating apparatuses.

17. The system of claim 15, wherein the first oil separating apparatus and the second oil separating apparatus are substantially identically shaped and sized, and wherein a first joint face of first oil separating apparatus abuts and is coupled to a substantially identically shaped second joint face of the second oil separating apparatus.

* * * * *